Aug. 5, 1952     L. J. HAWORTH ET AL     2,606,318
RADAR SYSTEM HAVING SPIRAL AND CONICAL SCANNING ANTENNA
AND TRIDIMENSIONAL INDICATOR
Filed April 19, 1944     8 Sheets-Sheet 1

INVENTORS
LELAND J HAWORTH
JAMES M PURCELL
ATTORNEY

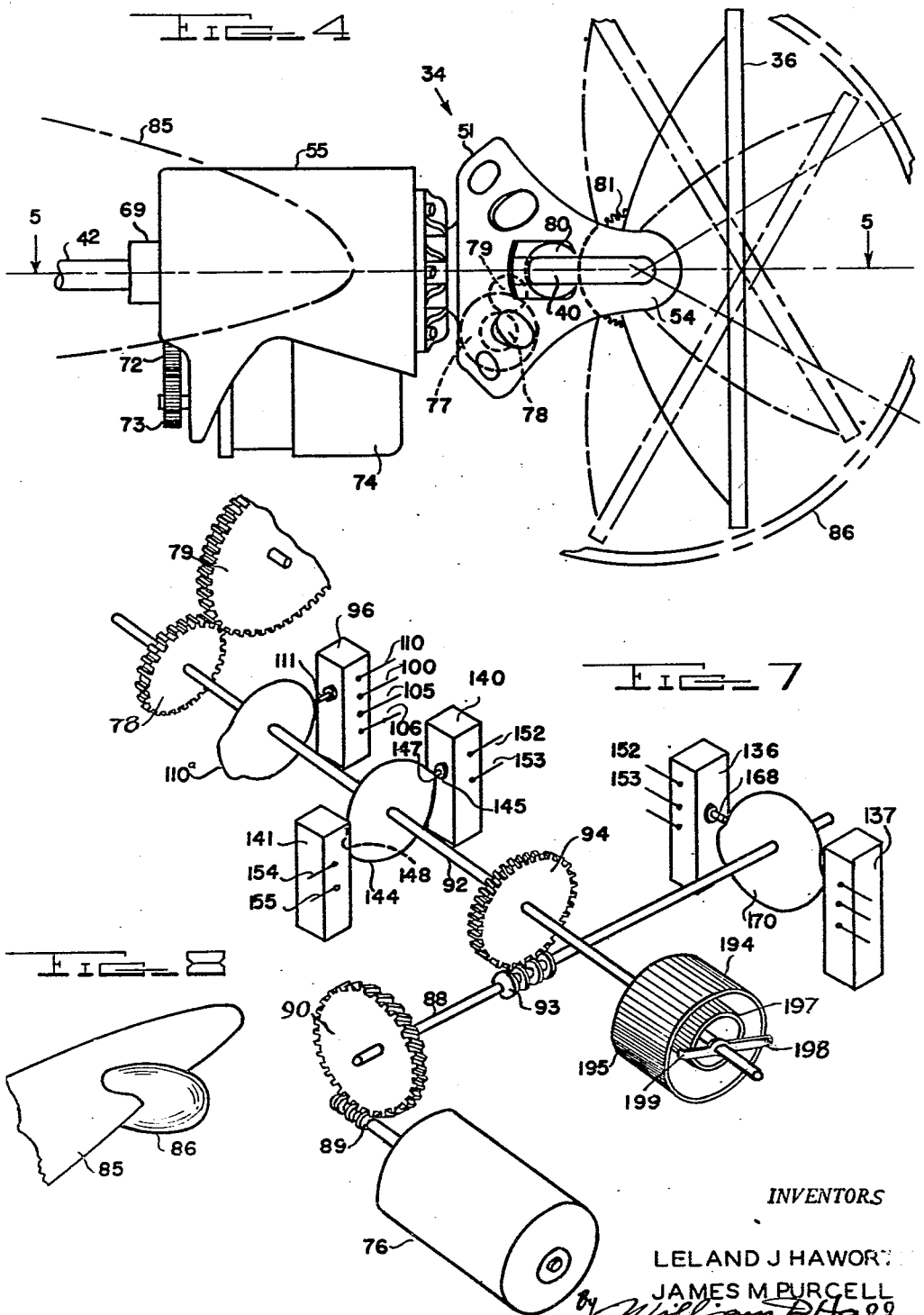

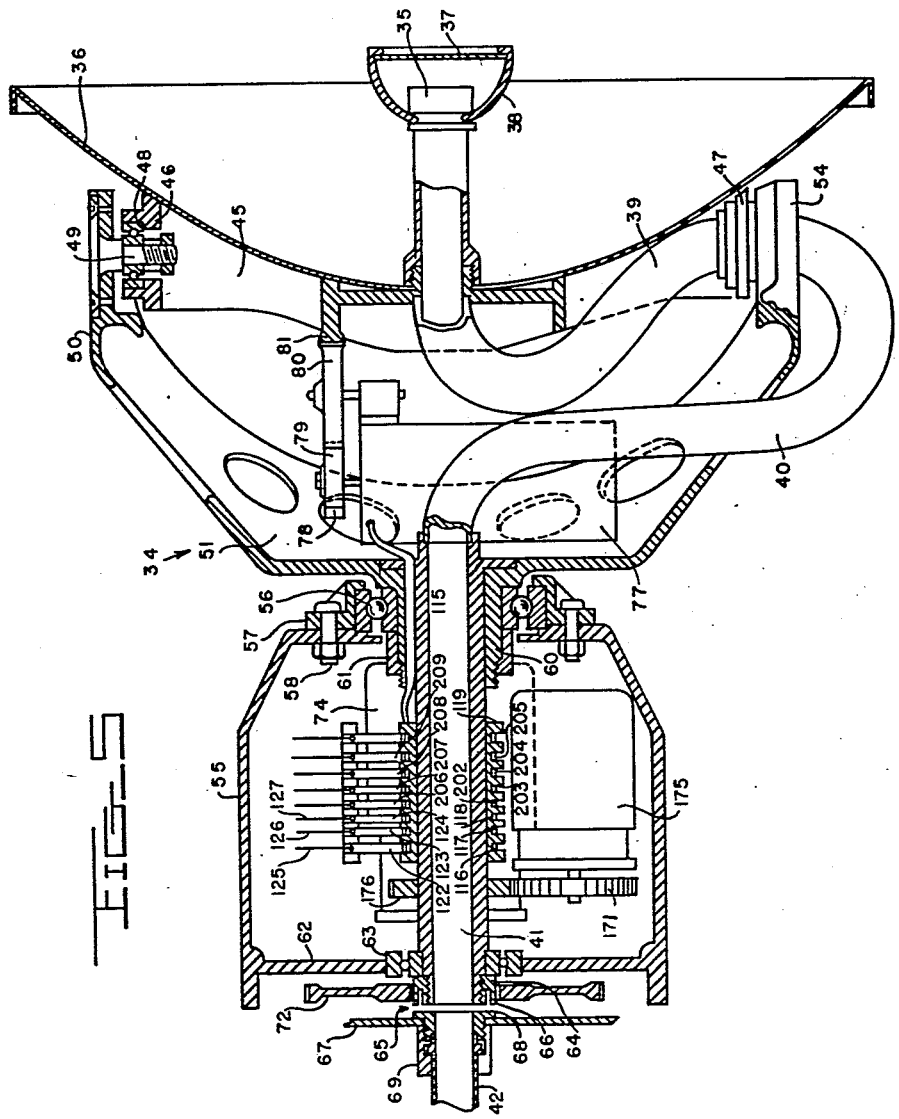

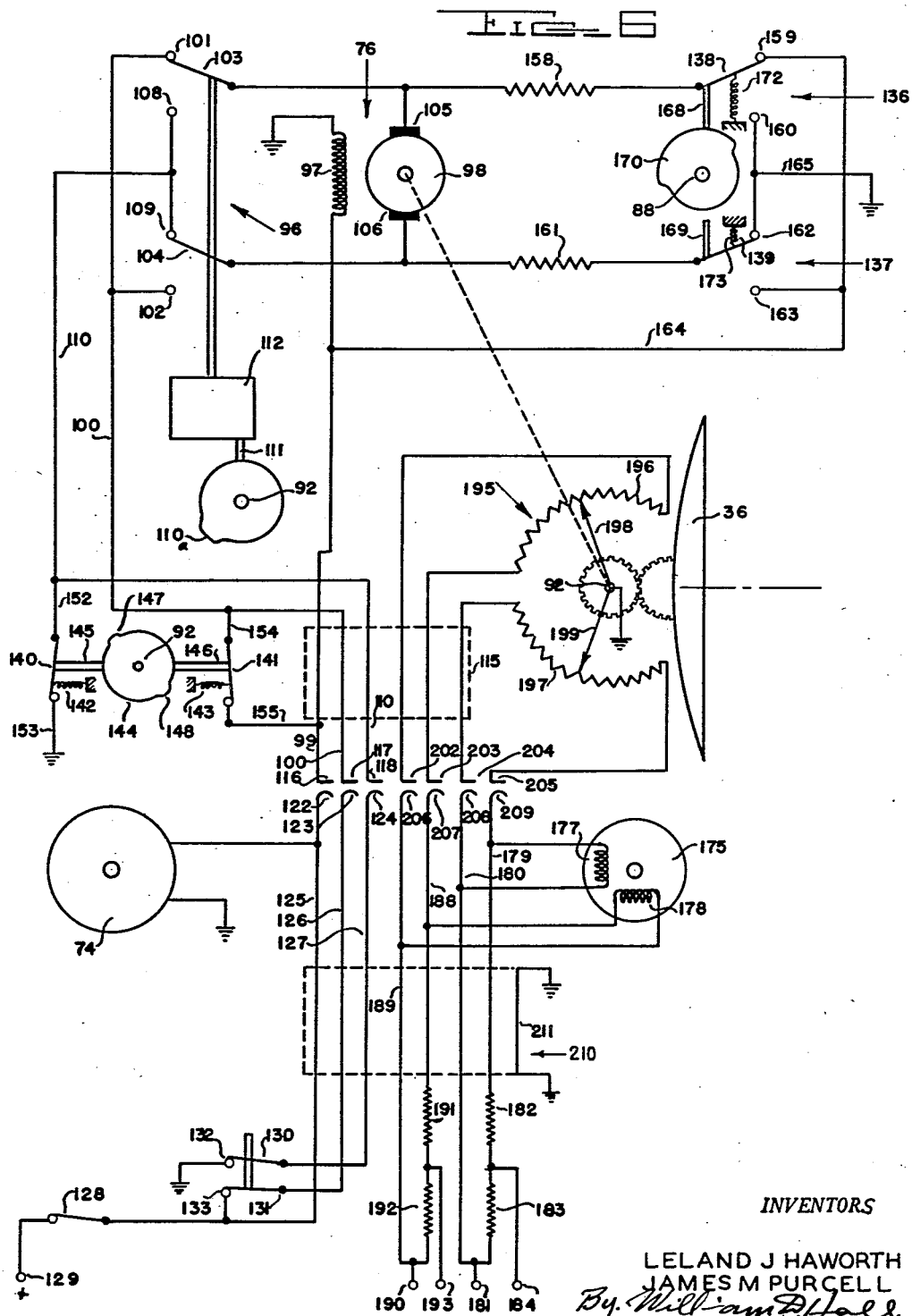

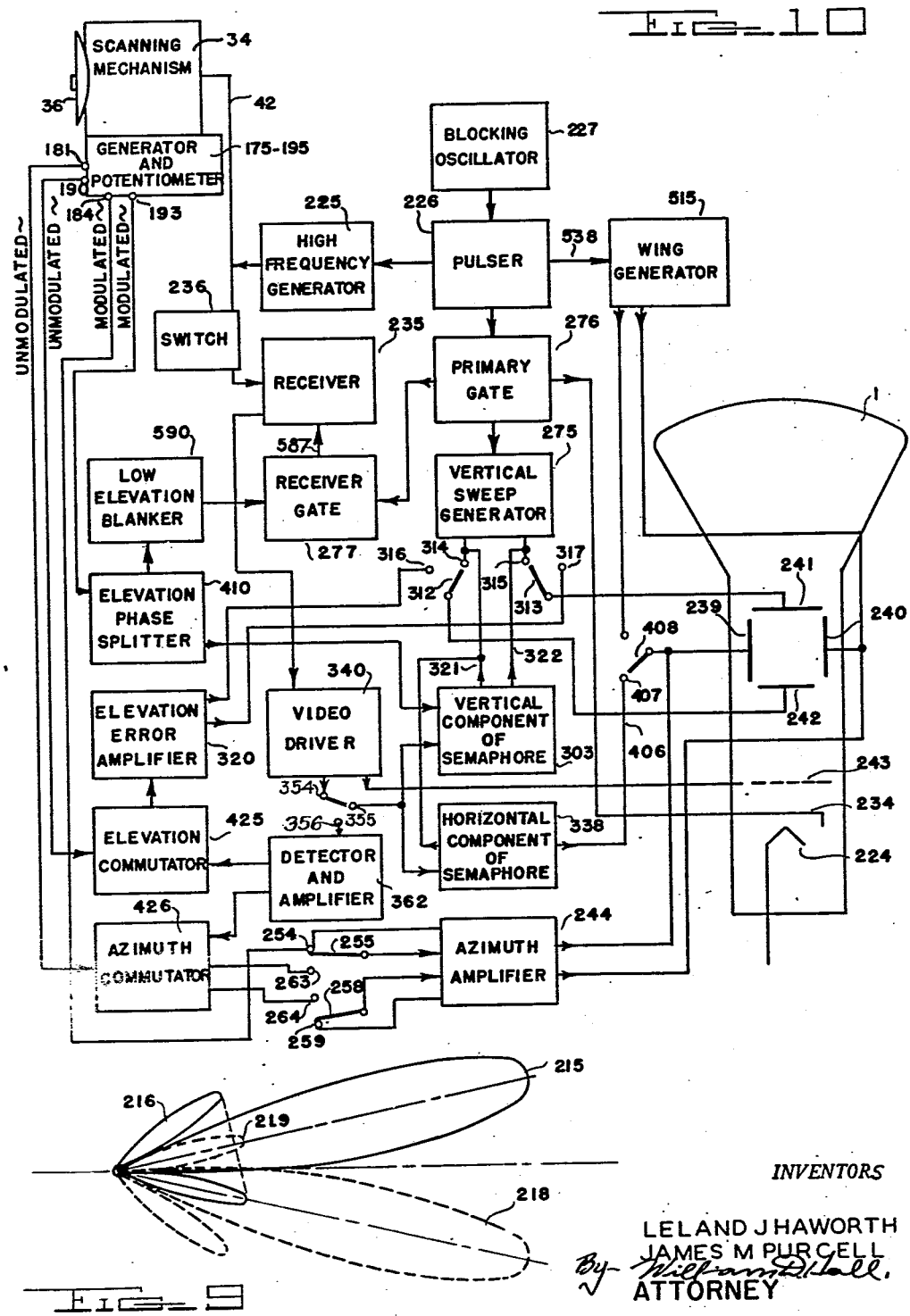

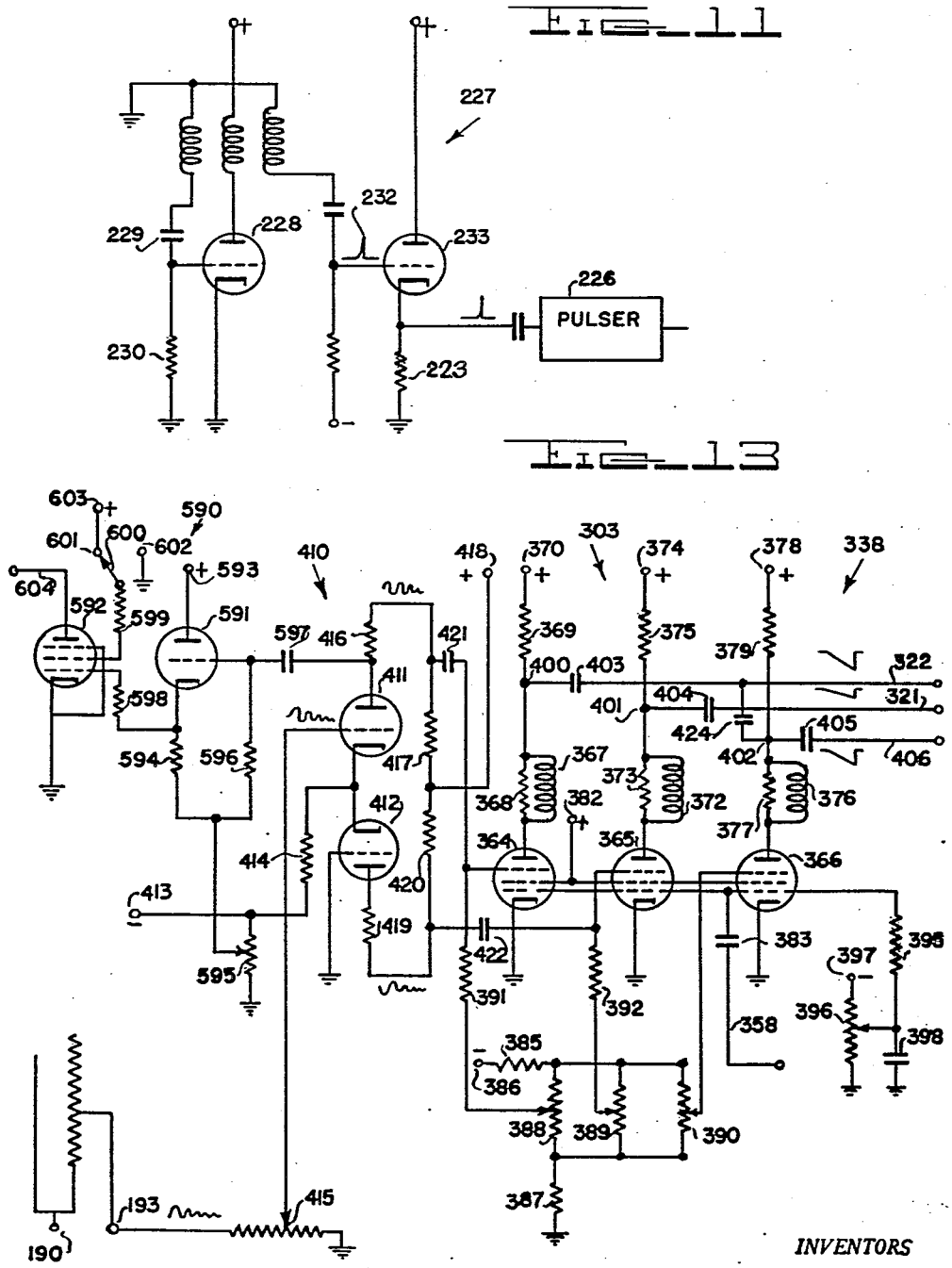

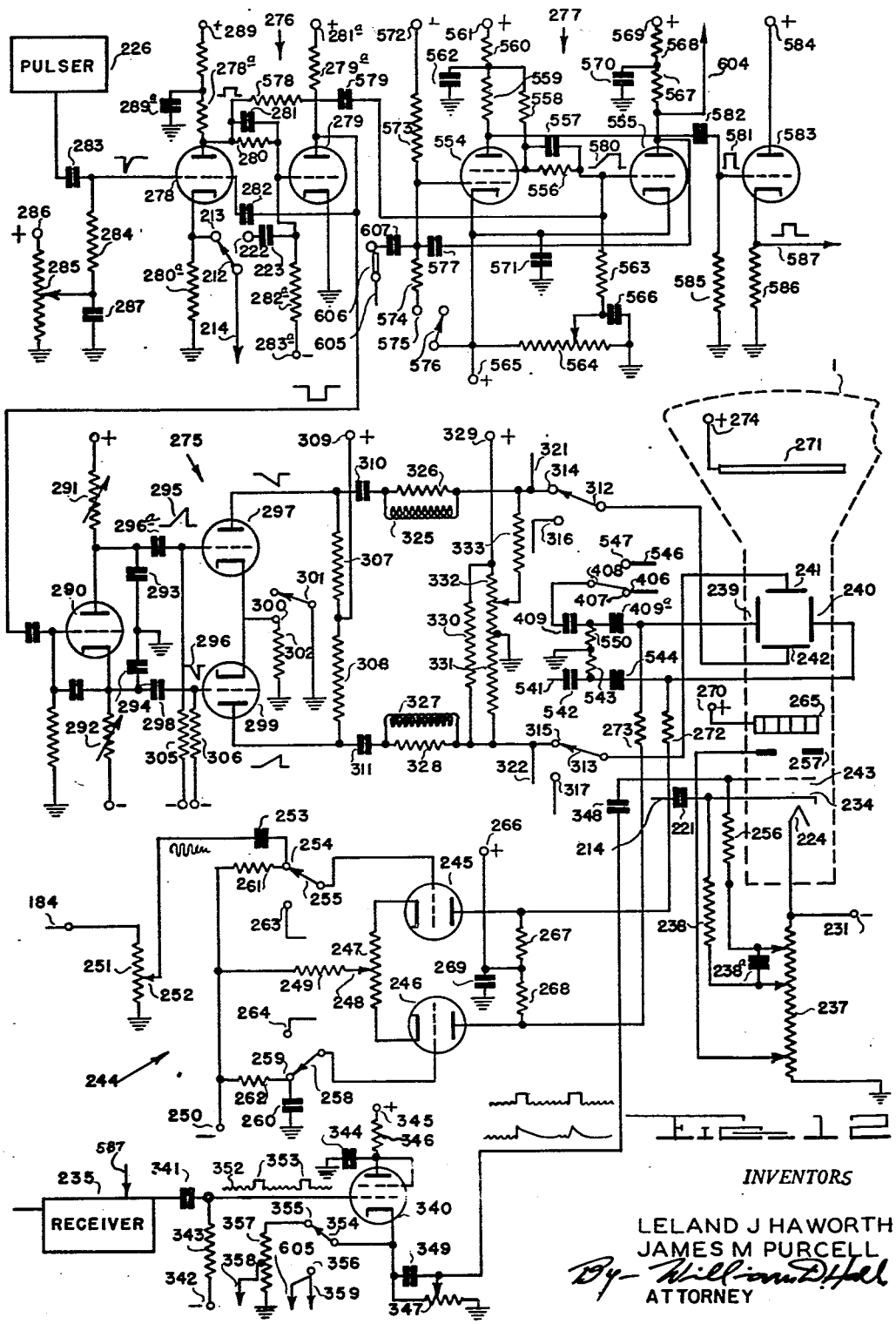

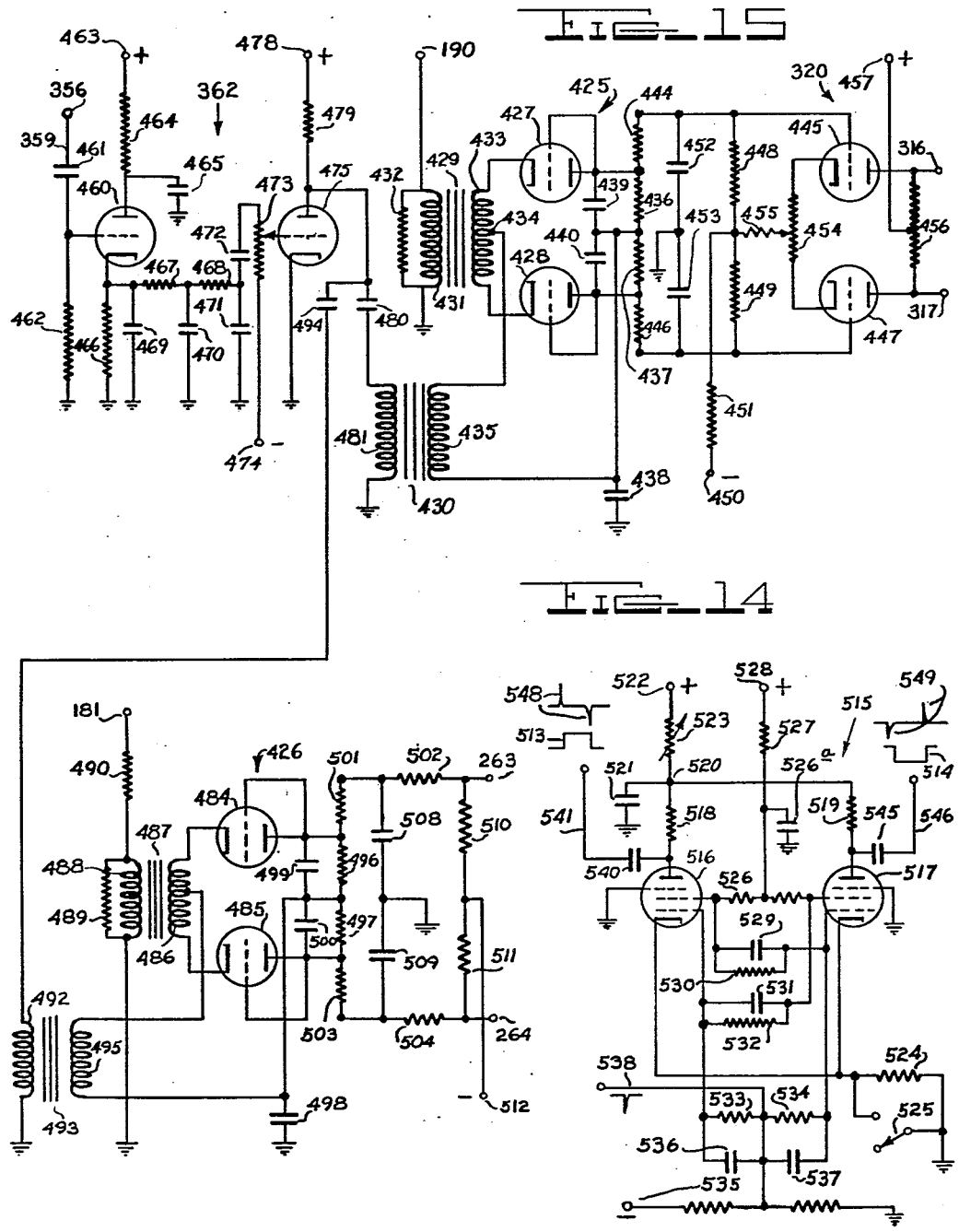

Patented Aug. 5, 1952

2,606,318

UNITED STATES PATENT OFFICE 2,606,318

RADAR SYSTEM HAVING SPIRAL AND CONICAL SCANNING ANTENNA AND TRIDIMENSIONAL INDICATOR

Leland J. Haworth, Belmont, and Edward M. Purcell, Cambridge, Mass., assignors, by mesne assignments, to the United States of America as represented by the Secretary of War Application April 19, 1944, Serial No. 531,826

23 Claims. (Cl. 343—11)

This invention relates to a communication system and particularly to a radar system for searching and locating targets. In order to search and locate a target in space, it is necessary to determine three coordinates with reference to an observer as the center of the coordinate system. Thus the range is the straight line distance from the observer to the particular target. The azimuth and elevation refer respectively to the horizontal and vertical angles with reference to fixed vertical and horizontal planes respectively. These terms are all well known in aerial navigation and have the same meanings as used herein.

In order to locate a target with a radar system, it is necessary to direct a pulse of radiant electromagnetic energy upon the target. The target in question will reflect certain of this energy back toward the transmitting station where it may be received. By measuring the time interval elapsing between the initiation of the radiant pulse and the receipt of the echo pulse, the range of such a target may be determined. The azimuth and elevation of the target may be determined by correlating the corresponding bearing of the axis of the transmitting antenna with the indicating means. Thus the antenna system for transmitting and receiving the electromagnetic energy may be moved or operated upon in a suitable manner so that the main axis of its radiation will scan in any desired direction.

The data received by a radar system of this character is customarily presented upon the fluorescent screen of a cathode ray tube in a well-known manner. As a rule, only two out of three coordinates of a target are presented upon one screen so that it has been the practice to utilize two separate screens usually in two separate cathode ray tubes for presenting the three coordinates necessary to locate a target. This invention provides means whereby all three coordinates of a target may be presented upon the one screen of a cathode ray tube.

The invention in general provides a system whereby searching for a target, usually over a large, solid angle, is accomplished by spiral scanning. In this type of scanning the main axis of radiation is moved in such a way that it is continuously generating spirals of decreasing or increasing character as viewed on a plane perpendicular to such axis. The spiral scanning is accomplished by the use of an antenna system including a parabolic reflector. The parabolic antenna system is rockable about a tilt axis so that the axis of the paraboloid may be deflected from a normal central position, this angle of deflection having any desired value and for convenience being set at 60°. Thus the side sweep of the antenna system may, as an example, be about 120°. At the same time, the paraboloid is spun around an axis which coincides with the paraboloid axis at zero tilt. The two movements of the antenna system thus provide a spiral scan with the pitch of the spiral being at any desired value. In practice, the tilting movement of the antenna may occur at the rate of about fifteen times per minute, while the spinning may occur at a rate of about 1,000 revolutions per minute.

The invention further provides a different type of scan when a target has been located and when it is desired to train the system upon the target. In such a case, means are provided for generating a circular scan wherein the main axis of radiation from the antenna system generates a circle about the no-tilt axis of the antenna system. This circle subtends a comparatively small, solid angle in space. Means are provided whereby the antenna system comes to rest as far as rocking is concerned at a predetermined position of tilt so that spinning of the antenna system generates the circular scan referred to above.

In connection with the spiral scan, the invention provides the presentation of three target coordinates upon one screen. The presentation is in the form of one or more short lines generally parallel to each other. These lines may start from a predetermined region on the screen, the location of this region on the screen being determined by two of the coordinates, while the angle of inclination of these lines to a reference axis gives the third coordinate. As actually disclosed herein, the origin of these lines locates the range and azimuth of a target, while the angle of the lines gives the angle of elevation with respect to the observer.

For presentation of data received by the system when operating with a circular scan, a different arrangement is provided. The system is trained upon one particular target within the solid angle subtended by the scanning. The target itself is presented as an illuminated spot upon the screen, the position of the spot on the screen being determined by azimuth and elevation. Inasmuch as the solid angle subtended by the scanning in this method is comparatively small, it will be understood that the data thus presented is with reference to the axis of scanning. In addition to the target echo presented as a luminous spot, side wings are added to the spot, these wings extending in a horizontal direction on the screen. The length of the wings is an inverse indication of the range, the longer the wings, the shorter the range.

Thus a system of this character may find particular use in air interception where a target is first to be found and selected and thereafter maintained in sight and approached until a predetermined firing range has been attained.

Referring now to the drawings:

Fig. 4 is a side elevational view of the antenna-reflector mechanism for producing the two different scans of the electromagnetic beam;

Fig. 5 is a sectional plan view of the antenna and reflector and associated mechanism shown in Fig. 4, taken on the line 5—5 of Fig. 4;

Fig. 6 is a circuit diagram of the control circuit and associated parts of the apparatus for controlling the two scanning procedures and changing from one to the other;

Fig. 7 is a schematic expanded view of the moving mechanical parts of the circuit of Fig. 6;

Fig. 8 is a perspective view of a portion of the wing of an airplane showing the manner in which the scanning mechanism may be mounted thereon when the device is used in an airplane;

Fig. 9 is a diagrammatic representation of one form of the energy distribution pattern which may be produced by the antenna-reflector system of Figs. 4 and 5;

Fig. 10 is a block diagram of the entire system showing the connection of the various parts;

Fig. 11 is a circuit diagram of a blocking oscillator arranged to produce a trigger voltage for initiating the pulse of the system;

Fig. 12 is a circuit diagram showing the manner of producing the horizontal and vertical components for the normal sweep of the electron beam of the cathode ray tube for one type of indication;

Fig. 13 is a circuit diagram of the circuit for producing an auxiliary sweep for the electron beam of the cathode ray tube which cooperates with the normal sweep produced by the circuit of Fig. 12 to obtain the desired indication;

Fig. 14 is a circuit diagram of the circuit used for the normal control of the electron beam of the cathode ray tube for producing the other type of indication; and Fig. 15 is a circuit diagram of the circuit for generating an additional movement of the electron beam besides that produced by the circuit of Fig. 14.

Data presentation

Figure 1:
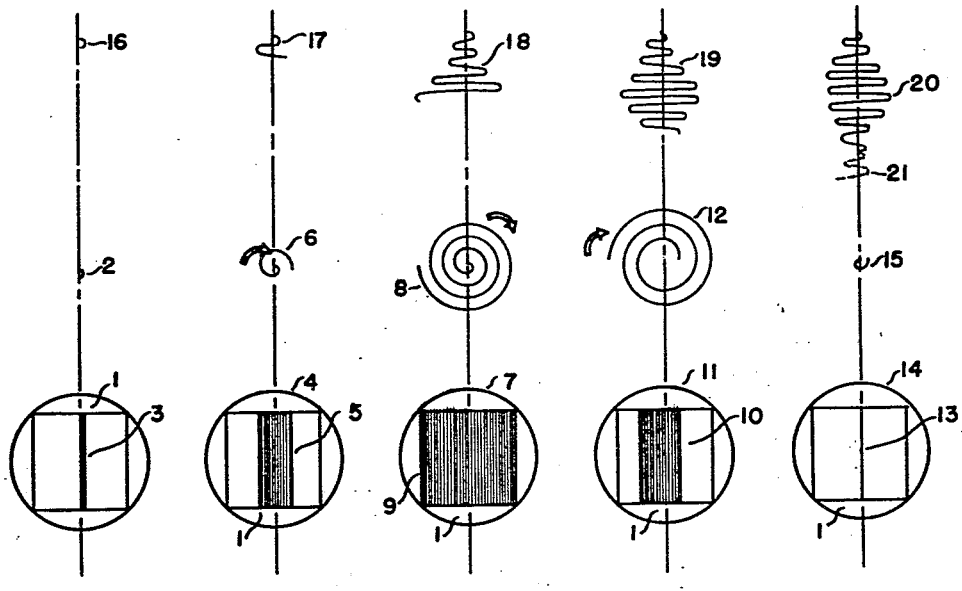
Fig. 1 is a diagrammatic representation of one scanning procedure illustrating several different stages in the movement of the beam, together with corresponding cycles of an alternating current wave used for controlling the beam, it being understood that the beam is actually suppressed except when target presentation data is made.

In Fig. 1 are shown five different representations of the face of a cathode ray tube 1, which may be the indicating device of the system, illustrating how the electron beam is moved to produce the relative azimuth, angle and range of the object or objects represented on the face of the tube when spiral scan is used. As the beam of electromagnetic radiation traces the spiral scan in space, the electron beam in the cathode ray tube is caused to move from side to side, the displacement from the center of the tube at all times corresponding to the horizontal displacement of the electromagnetic beam from the axis about which the spiral is formed. At the same time the electron beam in the cathode ray tube is caused to sweep vertically from a line across the lower edge of the face of the tube to a line across the upper edge of the face each time a pulse of electromagnetic radiation is transmitted and the rate of movement of the electron beam during each vertical sweep may be linear. The pulse rate of the electromagnetic radiation is very much faster than the movement of the electromagnetic beam in its spiral trace, and hence for every slight movement of the electromagnetic beam there will be several of these pulses. Therefore, as the electron beam in the cathode ray tube moves from side to side in synchronism with the side to side movement of the electromagnetic beam, the sweeps of the electron beam in the cathode ray tube will come very close together and will be substantially vertical.

At the left in Fig. 1 the face of the cathode ray indicator tube 1 is represented at a time when the spiral scan of the electromagnetic beam starts from the center of the scanning spiral. The first half-cycle of the spiral is indicated by small curved line 2 immediately above tube 1. During the time that the electromagnetic beam is passing through this half-cycle at the start of the spiral scan, the electron beam in the cathode ray tube is producing perhaps as many as fifty vertical sweeps, as indicated by solid vertical lines 3. These vertical sweeps will produce no visible indication on the face of the tube, as will be later explained.

Circle 4 in Fig. 1 represents the face of indicator tube 1 after the spiral scan has passed through a cycle and a quarter. The repeated vertical sweeps have moved towards the left across the center line of the tube and have moved back again towards the right as the spiral completes the next quarter-cycle, the lines passing farther to the right as the electromagnetic beam reaches the extreme right side of the spiral turn.

Circle 7 represents the face of indicator tube 1 at the time when the electromagnetic beam has reached the maximum outer turn of its spiral, this turn being indicated at 8 in the spiral immediately above circle 7. The repeated sweeps of the electron beam of the cathode ray tube by this time have reached the extreme left and right side of the tube, as represented by lines 9, so that the entire face of the cathode ray tube has been covered by the repeated vertical sweeps of the electron beam. Each turn of the spiral requires the same time as every other turn, and, since there are the same number of sweeps for each cycle, it will be seen that, as the radius of the spiral increases, the vertical sweeps will be farther apart.

Now the radius of the spiral which the electromagnetic beam is tracing begins to decrease and vertical lines 10 on cathode ray tube 1 represented by circle 11 will be formed, with their maximum side positions nearer and nearer to the center, as the spiral decreases in radius. Spiral 12 immediately above circle 11 illustrates the second half of the spiral where the radius is receding, the first half, shown above circle 7, having been omitted for clearness. The width of the portion of the tube made by lines 10 is shown as corresponding to the inner half-cycle of spiral 12.

As the spiral continues to decrease in radius the vertical lines approach nearer and nearer to the center until a single line 13 is formed at the center, as indicated in circle 14 which represents cathode ray tube 1 at the end of a complete scanning cycle. The last three-quarter turn of the spiral is indicated at 15.

It will thus be seen that repeated vertical sweeps of the electron beam in cathode ray tube 1 are caused by the repeated pulses of electromagnetic radiation and that these sweep lines are caused to start from the center of the cathode ray tube when the axis of the electromagnetic beam coincides with the axis of revolution and to move from side to side, reaching ever-increasing distances from the center as the electromagnetic beam traces its spiral path, and then, after the maximum position has been reached, to continue to move from side to side but with ever-decreasing distances from the center of the tube, as the spiral trace approaches its center again. This causes the vertical sweeps of the cathode ray tube to have a bellows-like action as the electromagnetic beam scans the field in a spiral pattern.

Simultaneously with the spiral scanning of the electromagnetic beam, an alternating voltage, preferably in the general form of a sine wave, is produced in a manner to be later described at a frequency equal to the frequency of revolution of the electromagnetic beam and having an instantaneous value which is proportional to the cosine of the angle of revolution of the beam. Thus, one cycle of the alternating voltage corresponds to one cycle or turn in the spiral path of the electromagnetic beam. This alternating voltage is modulated, in a manner to be later described, by the movement of the electromagnetic beam from side to side. This alternating voltage is illustrated diagrammatically by the sine wave represented above each of the spiral diagrams in Fig. 1. Thus, curve 16 represents a half-cycle of the sine wave as it starts from zero and rises to an amplitude corresponding to the horizontal displacement of the electromagnetic beam. Wave 17 shows that portion of the sine wave corresponding to spiral curve 6, the amplitude having increased. Wave 18 shows the sine wave at its maximum amplitude when the electromagnetic beam has moved to its outermost position. Thereupon the amplitude of the sine wave starts to decrease, as indicated in wave 19, corresponding to spiral 12 of decreasing radius, and wave 20 indicates the voltage sine wave reducing to zero again by the electromagnetic beam crossing the center of its field of scan where it coincides with the axis of revolution. As the electromagnetic beam crosses the center, the phase of the sine wave is reversed, as indicated by dotted line 21, in a manner and for a purpose to be later described.

Figures 2, 3:
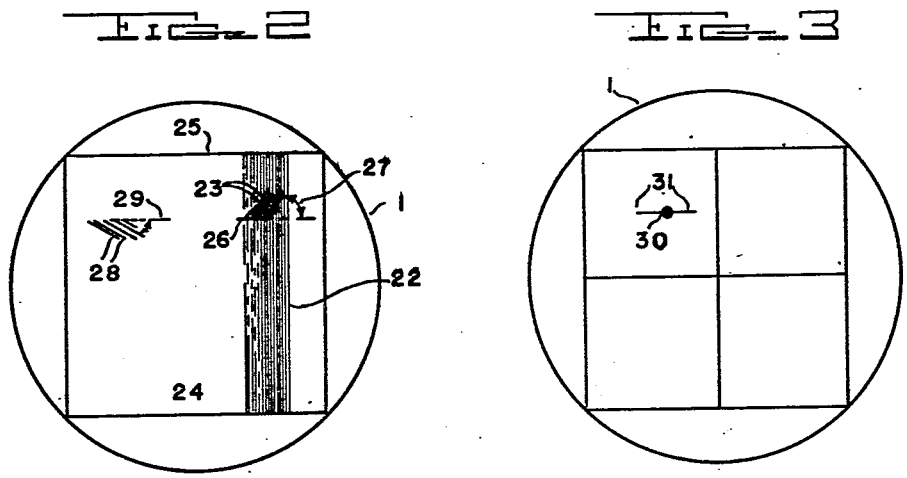
Fig. 2 is a front view of a cathode ray tube screen showing target presentation of the system when set for spiral scan.
Fig. 3 is a front view of a cathode ray tube screen showing target presentation by the system when set for circular scan.

In Fig. 2 is shown a representation of the face of cathode ray tube 1 with the type of indication produced by spiral scanning of the electromagnetic beam, as described above. The electron beam of the cathode ray tube continues to sweep vertically as each pulse of electromagnetic radiation is transmitted, tracing invisible lines 22 which have been represented in Fig. 1 as lines 3, 5, 9, 10, and 13. These may be entirely invisible until reflected radiation received by the apparatus is caused to intensify the beam. When the signal caused by such reflected radiation from an object in space is received, the electron beam is intensified, so that a spot of light is produced on the face of the tube, whereupon, by means to be hereinafter described, vertical movement of the electron beam is momentarily interrupted and line 23 is traced at angle 27 to the horizontal, which angle corresponds, in a manner to be later described, to the vertical elevation of the object which has reflected the radiation. This line will be referred to hereinafter as a "semaphore" and the indication as "semaphore indication." The pulses are close enough together in time so that an object, as, for instance, an airplane will intercept and reflect back the radiation from a number of pulses, and hence a semaphore 23 will be produced, starting from each vertical sweep initiated by these pulses, and several semaphores 23, shown in Fig. 2, will appear. Since each vertical sweep of the electron beam starts from a horizontal base line 24 when the pulse of radiation is transmitted and travels upwardly towards an upper limiting horizontal line 25, the distance from line 24 to horizontal line 26 from which the semaphores 23 start will be a measure of the range of the object reflecting the radiation. The horizontal position of the starting point of semaphores 23 will correspond to the horizontal direction of the electromagnetic beam when the radiation producing the reflected signals was initiated. Thus, the horizontal average position of the starting points of semaphores 23 will correspond to the horizontal position of the particular object in space. At the same time angle 27 of semaphores 23 with respect to horizontal line 26 will represent the elevational position of the object.

The electron beam may be caused to move either to the left or right to produce the semaphore, but it should preferably move in the same direction for each signal, so as to be able easily to identify the point of origin of the semaphore. The angle up or down of the semaphore may be arbitrarily chosen to represent elevation above or below the horizontal. In the system described, if the semaphores point upwardly, the object is above the horizontal center of the field of scan, and if they point downwardly, the object is below the center, while an object directly on the horizontal center of scan will produce merely a horizontal semaphore with zero angle.

The target represented by lines 23 is to the right of the center of the scanned field and above the center, while the target represented by lines 28 is below the horizontal center of the scanned field, as indicated by the downwardly extending lines, and to the left of the vertical center of the scanned field. The range, however, of the target producing lines 28 is approximately the same as that producing lines 23, as shown by the fact that horizontal line 29 from which lines 28 start is approximately the same distance from base line 24 as horizontal line 26 from which lines 23 start.

The fluorescent screen on cathode ray tube 1 is preferably provided with a long enough persistency of fluorescence to prevent the semaphores from fading out during the time the electromagnetic semaphores are produced again by the next succeeding interception of the electromagnetic beam by the particular object. This persistency, however, should not be so long as to cause confusion when the position of an object within the field changes rapidly. Thus, lines 23 will appear steady with a minimum of flicker.

Likewise, other objects within the field of scan will appear as bright semaphores on the face of the tube, and, because of the persistent screen of the cathode ray tube, will appear there simultaneously with semaphores 23; the operator can thus see before him representations of all of the objects within the field of scan and within range of the apparatus.

When the operator selects one object within the field which he wants to follow, as, for instance, where the apparatus is installed in an airplane and the target represents an enemy airplane to be tracked down and at which it is desired accurately to point a gun, then the operator switches to the other types of scanning and indication. The electromagnetic beam will then automatically be controlled, in a manner to be hereinafter described, to produce the circular scan, already referred to, and the indication on the face of tube 1 will appear as a spot of light 30, as indicated in Fig. 3. Spot 30 appears to remain continuously on the face of the tube and assumes a position with respect to the center of the tube as determined by the displacement of the particular object from the axis of circular scan. Spot 30 in Fig. 3 indicates that the target is above a horizontal plane through the axis of scan and to the left of a vertical plane through the same axis. In addition to the spot, side lines or "wings" 31 are generated by excursions of the electron beam of tube 1 from its normal position at 30, thus forming in effect a miniature airplane, wings 31 of which are caused, in a manner to be hereinafter described, to be approximately inversely proportional in length to the range of the object from the source of radiation. As the object is approached wings 31 increase in length. This type of indication will be hereinafter referred to as "wing indication."

Where the system is being used on an airplane, the axis of circular scan of the electromagnetic beam may be made to coincide with the axis of flight of the airplane, so that when circular scan is being used with wing indication, the pilot has only to shift the direction of movement of his airplane to cause it to move directly at the target. If the indication appears, therefore, as in Fig. 3, the pilot will point his airplane up and to the left, until spot 30 moves to the center of the tube. He will then fly the airplane so that the spot remains at the center of the indicator tube. When the wings grow to a predetermined length, indicating that he is a predetermined distance from the target, the guns, which may also be aligned with the axis of circular scan, may be fired to destroy the target.

*The scanning system*

The mechanism for producing the electromagnetic beam and for causing it to scan the field in space with either spiral scan or circular scan is illustrated in Figs. 4 and 5. Electromagnetic radiation of short wave length is preferred. Thus waves which are usually measured in centimeters may be used. A suitable type of radiator for the particular wave length used is provided. This radiator, in the apparatus selected to illustrate the invention, comprises an open-ended hollow-pipe wave guide 35, mounted adjacent the focal point of a metallic reflector 36, which may be a paraboloid, a metal disk 37 being spaced from the open end of wave guide 35, so as to reflect radiation coming from the wave guide to reflector 36 where it is redirected towards the right of Fig. 5 into a beam. It will be understood that the dimensions and spacing of wave guide 35, reflector 36, and the spacing and size of disk 37 are such as to produce a relatively narrow beam of electromagnetic radiation, or, in other words, electromagnetic radiation in which the energy distribution pattern is in the form of a narrow beam the axis of which preferably coincides with the axis of the reflector. Metal disk 37 may be spaced in front of wave guide 35 by means of an insulating member 38, with walls shaped like the walls of a cup and made of a material through which the radiation may readily pass.

The high-frequency electrical oscillations are delivered to radiating member 35 by means of additional differently-shaped wave guide sections 39, 40, 41, and 42, from a source of such oscillations which will be described later. The purpose of the different wave guide sections will also appear later.

Reflectors 36 and 37 and radiator 35 form a dirigible antenna system which is arranged on a mount designated generally as 34 to have two different movements. One movement, which may be referred to as the "tilt" movement is produced about an axis, hereinafter referred to as the "tilt axis," of reflector 36. To provide for this movement reflector 36 is mounted upon bracket 45 which extends across a portion of the convex surface of reflector 36 and is curved to conform thereto. Bracket 45 is provided with diametrically opposite bearing members 46 and 47 which are aligned with the tilt axis of reflector 36. Bearing 46 is provided with a suitable ball-bearing 48 which is associated with a spindle 49 secured to arm 50 of a yoke 51. Bearing 47 is arranged to include a rotary joint for wave guides 39 and 40 and cooperates with a ball-bearing (not shown) which rotatably supports bearing 47 in other arm 54 of yoke 51. Section 39 of the wave guide is bent, as indicated in Fig. 5, to connect the inner end of wave guide section 35, which is aligned with the axis of the reflector, to wave guide section 40 through bearing 47, so that reflector 36 may turn about bearings 46 and 47 on its tilt axis without interfering with the transmission of energy to radiator 35.

To provide the other movement for antenna system 35—36—37 yoke 51 is mounted upon housing member 55 in such a manner as to rotate on an axis perpendicular to the tilt axis. This second axis will be hereinafter referred to as the "spin axis" and may, for example, lie in a horizontal plane. In order tto accomplish this rotation on the spin axis, yoke 51 is rigidly mounted upon section 41 of the wave guide which is arranged to coincide with and to rotate about this second axis of rotation or spin axis. The end of section 41 of the wave guide which is adjacent bracket 51 is rotatably mounted in housing 55 by means of a suitable ball-bearing 56 the outer ball race of which is secured by collar 57 held upon housing 55 by means of bolts 58. Yoke 51 is secured to section 41 of the wave guide by means of sleeve 60 which extends axially of yoke 51 and surrounds section 41 of the wave guide upon which it may be rigidly secured in any desired manner. The inner ball race of ball-bearing 56 is held in position on sleeve 60 by means of a suitable sleeve nut 61 having threaded engagement with sleeve 60. The other end of wave guide section 41 is rotatably mounted by means of a ball-bearing 63 in a web 62 forming a portion of housing 55. The inner ball race of ball-bearing 63 fits over the end of wave guide 41, which is reduced in outside diameter to receive it, and is held in position by means of a sleeve 64 which has threaded engagement with the end of the wave guide section.

Thus constructed, section 41 of the wave guide is free to rotate on its own axis, the spin axis, within housing 55, carrying with it yoke 51 which also carries reflector 36 and associated parts. If reflector 36 is in the position indicated in Fig. 5, at zero tilt with its axis aligned with the spin axis, rotation of section 41 and yoke 51 will merely cause the reflector to rotate upon its axis. However, if reflector 36 has been rotated in bearings 46 and 47 through some predetermined fixed angle about its tilt axis, and is maintained in that position of tilt, then rotation of yoke 51 will cause the axis of reflector 36 to trace a surface of a cone and the circular scan of the electromagnetic beam will result; but if reflectors 36 is rocking continuously about the axis of tilt, the axis of reflector 36 will trace the spiral path already described and the spiral scan of the electromagnetic beam will result.

Section 41 of the wave guide is connected to section 39 by means of section 40 which is bent in such a manner that at all times one end aligns with section 41 and the other end aligns with the end of section 39 adjacent bearing 47. To permit movement of the parts, a suitable rotary joint must be provided between wave guide sections 39 and 40 and another between wave guide sections 41 and 42. These joints may have the form of that shown between sections 41 and 42 which is indicated at 65. The end of wave guide section 41 is spaced slightly from the end of section 42, a quarter-wave length choke being provided in one or both sections to prevent the escape of energy. The construction of such joints is more fully described in application of Winfield Salisbury, Serial No. 489,844, filed June 6, 1943, Patent No. 2,451,876, dated October 19, 1948.

The end of wave guide section 42 is shown secured to a panel 67, which may form part of a supporting structure, by means of a bushing 68 and cooperating sleeve nut 69, the panel being held between the flanged end of the bushing which forms the end of wave guide 42 and the sleeve nut which also secures wave guide section 42 to bushing 68.

In order to rotate yoke 51 about the spin axis, gear wheel 72 is shown rigidly secured around sleeve nut 64 on the outer side of web 62. This gear wheel meshes with a gear wheel 73 (Fig. 4), carried by the drive shaft of a motor 74 (Figs. 4 and 5), this motor being mounted partly within housing 55 which has a suitable opening in the side to retain it. The speed of rotation about the spin axis may be in the neighborhood of 1000 revolutions per minute.

Rocking of reflector 36 about the tilt axis is produced by a motor 76 (Fig. 7), which is enclosed in housing 77 shown in Figs. 4 and 5 mounted in yoke 51. Motor 76 is connected through a gearing mechanism, which will be later described in connection with Fig. 7, to a gear wheel 78 which meshes with a gear train including idler gear wheels 79 and 80, the latter of which meshes with a gear sector 81 attached to reflector supporting bracket 45. Gear sector 81 has its center of curvature on the tilt axis. Rotation of gear 78 by means of motor 76 will rock reflector 36 about the tilt axis through the gear train, including gear wheels 79, 80, and gear sector 81. Rocking of reflector 36 about the tilt axis may be at any desired speed such as from a fraction of one to several seconds for the reflector to rock from one extreme position to the other.

It will be understood that the moving parts of the antenna system are dynamically and statically balanced so that they may be moved at fairly high speeds without substantial vibration.

Housing 55 may be mounted in any desired location where the apparatus is to be used, it being understood that the space in front of reflector 36 should be free so as not to interfere with electromagnetic radiation. Where the system is to be operated on an airplane, it has been found desirable in some instances to mount the reflector mechanism on the leading edge of a wing 85 (Fig. 8) of the airplane, housing it in a suitable nacelle 86. An outline of part of a wing 85 of the airplane together with nacelle 86 is shown in Fig. 4. Nacelle 86 may be made of suitable insulating material, such as that known to the trade as "plexiglas," which will permit the passage of radiation with little attenuation.

It is desirable to select one of the two scanning modes by operating a switch. Thus the operator can use a spiral scan as long as he desires. Then by throwing a switch, the reflector will automatically stop at a predetermined angle of tilt, which angle may be approximately 3°, and will continue thereafter to produce the circular scan. A return to spiral scanning may be accomplished by throwing the switch back.

In order to effect this change-over from one scanning motion to the other, the gearing and switching arrangement shown schematically in Figs. 6 and 7 may be used.

In general this mechanism operates in the following manner. During spiral scan, both motors 74 and 76 run. Motor 76 rocks the radiating system back and forth on the tilt axis (motor 76 reversing itself periodically) while the entire rocking radiating system is spun around the spin axis. Upon a change to circular scan, automatic switching means are provided for bringing the radiating system to a 3° tilt with respect to the axis of symmetry of the radiating system, this axis being the radiator axis at zero tilt and coincident with the spin axis. In case the momentum due to rocking carries the radiating system beyond the 3° tilt, then means are provided whereby the radiating system will slowly hunt for the position. Only one 3° position is selected, this one being at one side only of the zero tilt position.

As shown in Fig. 7 motor 76 drives a shaft 88 through worm 89 and worm wheel 90, worm 89 being connected to the motor shaft and worm wheel 90 being connected to shaft 88. Shaft 88, in turn, drives shaft 92 by means of worm 93 connected to shaft 88 and a worm wheel 94 connected to shaft 92. Shaft 92 carries gear wheel 78, which is also shown in Figs. 4 and 5 and which, as has already been explained, is connected by gear train 79—80—81 to reflector 36. The gear ratio between shaft 92 and reflector 36 is such that the reflector may rotate through an angle of 120°, for instance, 60° on each side of the spin axis, while shaft 92 rotates through something a little less than 360°, say 345°. This ratio is provided for a purpose to be later described and in general is due to the fact that shaft 92 rocks back and forth rather than rotates continuously in one direction.

As the shaft of motor 76 rotates in one direction about the tilt axis, reflector 36 will rock in one direction and whenever the motor shaft rotates in the opposite direction, reflector 36 will rock about the tilt axis in the opposite direction. The rocking of the reflector about the tilt axis is therefore accomplished by rotation of the shaft of motor 76 first in one direction and then in the other. A reversing switch 96 (Fig. 6), is provided which is adapted to cause this reversal of rotation of the motor automatically whenever reflector 36 reaches the predetermined limit of its rocking movement in either direction. This switch comprises a double-pole, double-throw switch, the poles of which are ganged together for simultaneous operation.

In the particular arrangement shown by way of illustration, motor 76 (top of Fig. 6), is a direct current motor with a separately excited field winding 97. When current flows through armature 98 in one direction, the motor will rotate in one direction, while by reversing the direction of current through the armature, the motor will reverse its rotation. Switch 96 accomplishes this result.

One end of field winding 97 is connected to ground, while the other end is connected to a wire 99 which is connected in a manner to be later described to a source of direct current potential. As long as wire 99 is connected to the source of potential, field winding 97 of motor 76 is energized. A second wire 100 is similarly energized by direct current and is connected to contacts 101 and 102 of reversing switch 96, which contacts are adapted to be engaged, respectively, by the electrically independent switch arms 103 and 104 which are connected, respectively, to armature brushes 105 and 106. Additional contacts 108 and 109 on the switch are connected together and to a wire 110 which is connected to ground in a manner to be later described and provides the return circuit for armature 98.

The contacts of switch 96 are arranged so that when the switch arms are in one position, switch arm 104 is in engagement with contact 109 and separated from contact 102, while switch arm 103 is engaging contact 101 but out of engagement with contact 108. When the switch is in the other position, however, contact 108 is engaged by switch arm 103 which is separated from contact 101, while switch arm 104 is in engagement with contact 102 and separated from contact 109.

When switch 96 is in the position indicated in Fig. 6, it will be seen that current can flow from wire 100, if that wire is connected to a source of potential, through contact 101 and switch arm 103 to brush 105, through armature 98, from brush 106 through switch arm 104 and contact 109 to wire 110, which, as has been stated, is grounded at this time. Motor 76 will therefore rotate in one direction and will continue so to rotate until switch 96 is thrown to its opposite position with arms 103 and 104 in engagement with contacts 108 and 102 respectively. In this position, current flows from wire 100, through contact 102 and switch arm 104 to brush 106, and through armature 98 in a direction opposite to the direction in which it flowed before, from brush 105 through switch arm 103 and contact 108 to wire 110 which is provided with a ground connection. This will cause motor 76 to operate with armature 98 rotating in the opposite direction and it will continue so to rotate until the switch is again reversed.

In order to reverse switch 96 at the end of the rocking action of reflector 36, a cam 110a (Figs. 6 and 7), is provided on shaft 92 and is arranged to engage and depress a plunger 111 of switch 96 each time shaft 92 rotates through about 345° or 350° in either direction. Switch 96 is provided with a suitable toggle mechanism 112 by means of which the switch will be moved to its opposite position every time plunger 111 is depressed.

Since motor 76 and switch 96 are both contained in housing 77 which is rotated with yoke 51, it is necessary to provide slip ring connections. To this end, wires 99, 100, and 110 are connected, together with other wires, the purpose of which will be hereinafter described, in a cable 115, shown in Figs. 5 and 6 to a series of slip-rings 116, 117, and 118, mounted in a suitable grooved sleeve 119 (Fig. 5) over wave guide section 41 and rotatable with it. Slip-rings 116, 117, and 118 are engaged respectively by spring brushes 122, 123, and 124. These brushes are connected respectively to wires 125, 126, and 127. Wire 125 (Fig. 6), is connected to the arm of a main switch 128 the single contact of which is connected to a source of direct current, indicated at 129. Wires 127 and 126 are connected respectively to the arms of two single-throw switches 130 and 131 ganged together for simultaneous operation. Contact 132 adapted to be engaged by switch arm 130 is connected to ground, as indicated, and contact 133 adapted to be engaged by switch arm 131 is connected to wire 125 energized through main power switch 128.

Main driving motor 74 for spinning the radiator is connected between wire 125 and ground, so that it is energized as long as main switch 128 is closed and will therefore continuously rotate yoke 51 about the spin axis through gear connection 73—72. In order for reflector 36 to rock about the tilt axis while yoke 51 is rotating about the spin axis, switch arms 130 and 131 should be closed. However, since it is desired to produce the circular scan with the reflector set at an angle of approximately 3° from the spin axis, as already mentioned, it is necessary for reflector 36 to move to this particular position with respect to the spin axis when it is desired to switch from the spiral scan to the circular scan. An arrangement is provided whereby switch 130—131 may be thrown at any instant to shift from the spiral scan to the circular scan, regardless of this position of reflector 36, and reflector 36 will automatically seek the 3° circular scan position. In order to accomplish this, additional switches 136, 137, 140, and 141 are provided, as shown in Figs. 6 and 7. Switches 140 and 141 operate to continue to supply power to tilt motor 76, even though switches 130 and 131 are open except when the reflector has reached the desired 3° circular scan position. Switches 136 and 137 operate to hunt the 3° position of reflector 36 if the momentum of the apparatus tends to drive it past this point.

Switches 140 and 141 are single-pole, single-throw switches which are adapted to be held closed by means of springs 142 and 143, respectively, but are arranged to be opened simultaneously when the reflector reaches the 3° position. For this purpose a cam member 144 is mounted on shaft 92 with switches 140 and 141 arranged on opposite sides of shaft 92 and with plungers 145 and 146, associated respectively with switches 140 and 141 engaging the cam surface. Cam member 144 is provided with two diametrically opposite cam rises 147 and 148 which engage switch plungers 145 and 146 to open the switches when shaft 92 is in the rotational position corresponding to the 3° position of reflector 36. This angular position of shaft 92 is several degrees off of the central position of its angular oscillation, but cam rises 147 and 148 will line up with switch plungers 145 and 146 only once during rotation of shaft 92 in each direction. This is because shaft 92 does not make a complete 360° rotation. The arm of switch 140 is connected by means of wire 152 to wire 110, while the contact of the switch is connected to ground by a wire 153. The arm of switch 141 is connected by wire 154 to wire 100, while the contact of the switch is connected by wire 155 to wire 99.

Assume that the apparatus has been operating with the spiral scan with switches 130 and 131 closed. Now if the operator desires to switch from the spiral scan to the circular scan, he will merely open ganged switches 130 and 131 which would normally open the circuit through armature 98. However, if shaft 92 is in such a position that cams 147 and 148 do not line up with switch plungers 145 and 146, switches 140 and 141 will be closed, and armature 98 of motor 76 will be energized from main switch 128, through wire 125, brush and slip-ring 122—116, wire 99, wire 155, the switch 141, wire 154, wire 100, one of switch arms 103 and 104, depending on the position of switch 96, through armature 98, through the other of switch arms 103 and 104, wire 110, wire 152, switch 140, to ground through wire 153. Thus, motor 76 will still be energized until shaft 92 has rotated to a position at which switches 140 and 141 will be opened by cams 147 and 148.

Opening of switches 140 and 141 will deenergize motor 76 but because of its momentum it may not stop exactly on the 3° position. Switches 136 and 137 are provided for the purpose of causing armature 98 of motor 76 to hunt and rotate slowly first one way and, if necessary, then the other, until the 3° position is accurately determined. Arm 138 of switch 136 is connected to brush 105 through resistance 158 and is adapted to engage either of two contacts 159 and 160. Arm 139 of switch 137 is connected to other brush 106 through a resistance 161 and is adapted to engage either of two contacts 162 and 163. Contacts 159 and 163 are connected together and connected by wire 164 to wire 99 which is energized through main switch 128 and slip-ring and brush 116 and 122. Contacts 160 and 162 are connected together and to ground by wire 165.

Switch arm 138 is provided with a plunger 168 and switch arm 139 is provided with a plunger 169, switches 136 and 137 being mounted on opposite sides of shaft 88. Shaft 88 carries a cam 170 which is adapted to engage plungers 168 and 169 as the cam rotates with shaft 88. The configuration of cam 170 is such that there will be one position of shaft 88 where neither of plungers 168 and 169 will be pressed back or away from shaft 88, but at all other positions one of the plungers 168 and 169 and only one will be pressed back to operate the associated switch. Switch arms 138 and 139 are caused, by means of springs 172 and 173, respectively, normally to engage contacts 160 and 162, respectively, when cam 170 is not pressing the associated plunger back so that during the time when neither of plungers 168 or 169 is pressed back, switch arms 138 and 139 will both be connected to ground. At any other time one of the switch arms will be energized from wire 164, while the other switch arm is grounded, thus permitting current to flow through armature 98 in one direction or the other through resistances 158 and 161. These resistances are such as to cause motor 76 to operate slowly when current is flowing through the armature in this manner and are sufficiently large to prevent the current through switches 136 and 137 from affecting the operation of the motor at other times. The position of cam 170 and shaft 88 is such as to cause both switch arms 138 and 139 to be connected to ground at the 3° position of reflector 36.

By means of worm and worm wheel connection 93—94 (Fig. 7), shaft 88 is arranged to rotate about ten times for every single rotation of shaft 92, and this causes switches 136 and 137 to operate repeatedly about ten times for each single rotation of shaft 92. There may therefore be rotation of cam 170 through an angle of several degrees after the power is shut off from motor 76 by the operation of the switches 140 and 141 when the switch-over from the spiral scan to the circular scan occurs. This will cause one of plungers 168 or 169 to be pressed back, whereupon motor 76 will get armature current through switches 136 and 137 in a direction to reverse the rotation of the motor. The motor will then rotate slowly in this reverse direction until both plungers 168 and 169 are free simultaneously, so that the source of current is removed from the armature. If the motor then over-runs itself in this reverse direction, the other switch will be operated by cam 170 to cause current to flow through the armature so as to reverse the slow rotation of the motor again in the direction of the 3° position. Eventually the motor will stop exactly on this 3° position of reflector 36. During the time that motor 76 is hunting back and forth to find the exact 3° position, switches 140 and 141 are maintained open by cams 147 and 148 which are wide enough circumferentially to keep the switches open, despite the continued oscillating movement of the shaft 88.

*Electron beam control system for spiral scan*

It has previously been stated that, for the purpose of controlling the horizontal movement of the electron beam in the cathode ray indicating tube, there is generated an alternating voltage wave, proportional to the cosine of the angle through which the electromagnetic beam is spun and this wave is modulated in proportion to the change in radius of the spiral as the spiral scan is produced. In addition to this alternating voltage wave, another similar wave is also produced which is proportional to the sine of the angle through which the electromagnetic beam is spun. The other similar wave proportional to the sine of the angle of spin is utilized to control the vertical deflection of the electron beam in the cathode ray tube only during the time that a target presentation is being made. This wave is also modulated by the change in radius of the electromagnetic beam in producing the spiral scan, and both the cosine wave and the sine wave are utilized in a manner to be later described in controlling the electron beam of the indicator tube when it produces semaphores 23 of Fig. 2.

To produce both of these alternating voltage waves a two-phase alternating current generator 175 (Figs. 5 and 6) is mounted within housing 55 in any desired manner and the armature thereof is caused to rotate once with each rotation of yoke 51 by means of a gear wheel 176 which is attached to section 41 of the wave guide and meshes with a gear wheel 171 mounted on the shaft of generator 175, the gear ratio being one to one. Generator 175 is a two-phase generator having two sets of windings 177 and 178 arranged in a known manner, so that the two windings will produce alternating sine wave voltages displaced 90° in phase relation when the armature of the generator is rotated. The rotational position of the generator shaft is fixed with respect to the rotational position of yoke 51, so that when the tilt axis passes through its horizontal position, the instantaneous voltage of the wave from winding 177 will be zero. When this is true the wave from winding 177 will be proportional to the cosine of the angle of spin and the wave from the winding 178 will be proportional to the sine of the angle of spin.

One end of generator winding 177 is connected to a wire 179 while the other end is connected to a wire 180, wire 180 being connected to terminal 181, while wire 179 is connected to the same terminal through equal resistances 182 and 183. The junction of resistances 182 and 183 is connected to terminal 184. Similarly, winding 178 of generator 175 has its ends connected to wires 188 and 189, the latter of which is connected to terminal 190, the former being connected to the same terminal through equal resistances 191 and 192. The junction of resistance 191 and 192 is connected to a terminal 193. Terminals 181, 184, 193, and 190 are used to connect to various control circuits which will be later described.

Modulation of the voltages at terminals 184 and 193 when reflector 36 rotates about the tilt axis is effected by means of a potentiometer 195 operated by shaft 92. Potentiometer 195 has two linear resistance windings 196 and 197, electrically independent of each other and engaged respectively by two arms 198 and 199 connected to ground. Arms 198 and 199 are mounted upon shaft 92, and the gear reduction between shaft 92 and reflector 36 causes arms 198 and 199 to make a sweep of 345° to 350° on potentiometer windings 196 and 197, respectively, when reflector 36 rotates about its tilt axis through approximately 120°.

In order to cause the change in position of the arms of the potentiometer to effect modulation of the alternating voltages produced by generator 175, potentiometer resistance 197 is connected across generator winding 177 and potentiometer resistance 196 is connected across generator winding 178. Since the generator is in housing 55 and stationary with respect to yoke 51, the connections are made by means of additional slip-rings 202, 203, 204, and 205 which cooperate respectively with resilient brushes 206, 207, 208, and 209. Brushes 206 and 207 are connected respectively to wires 189 and 188, while brushes 208 and 209 are connected respectively to wires 180 and 179. The remaining part of the control circuit for the indicator equipment may be positioned at some point remote from the scanning mechanism, and for making the proper connections wires 125, 126, 127, 189, 188, 180, and 179 may be made up in the form of a cable 210 provided with a grounded shield 211.

It will be seen from an inspection of Fig. 6 that any load circuit connected between either of terminals 184 and 193 and ground is effectively connected between the particular terminal and the corresponding potentiometer arm. Since resistances 182 and 183 are equal, and are connected in parallel with potentiometer resistance 197 across generator winding 177, there will be zero potential across the load when the potentiometer arm is at the electrical center of potentiometer resistance 197. The same thing is true with respect to terminal 193 and potentiometer 196. When potentiometer arm 198 is at the electrical center of potentiometer resistance 196, there will be zero voltage between terminal 193 and ground. Therefore, potentiometer arms 198 and 199 are mounted on shaft 92 so that they will pass through the electrical centers of potentiometer resistances 196 and 197 when the angle of tilt of reflector 36 is zero, or, in other words, when the axis of reflector 36 coincides with the axis of spin. Both voltage sine waves will rise in amplitude from zero when the tilt angle is increased from zero and will reach a maximum amplitude when the tilt angle is a maximum. The amplitude will then fall again as the tilt angle approaches zero and the phase will reverse as the tilt angle passes through zero.

The manner in which these modulated sine wave voltages are used to control the semaphore indication will be described later. It must be understood, however, that the modulation of the alternating voltages from the two-phase generator is necessitated by the fact that spin motor 74 is independent of tilt motor 76. Thus it may be that at one instant during spinning when the tilt axis is horizontal the radiator may have zero tilt and when the radiator has made one or more complete turns on the spin axis, the radiator may have some definite tilt. Since the horizontal displacement of the cathode ray beam during spiral scan is an indication of the radiator tilt in a horizontal plane it follows that a correlation between instantaneous spin and tilt radiator positions is necessary.

The antenna system described above will produce a concentrated beam of electromagnetic radiation. The energy distribution pattern for the electromagnetic beam may appear somewhat as represented in Fig. 9. In this figure a main lobe 215 of energy and principal side lobe 216 have been shown, the latter extending around the former and having a substantially annular cross section. There are usually other smaller side lobes but these have been omitted in the figure. The solid lines in the figure represent main lobe 215 and side lobe 216 when the electromagnetic beam is at its maximum elevation during circular scan, while these same lobes have been shown by dotted lines 218 and 219, respectively, when the electromagnetic beam is pointing in its lowermost direction. It is preferable to make the angle of tilt when the antenna system is being used for circular scan equal to approximately one-half the angle between the center of the side lobe and the axis of the main lobe. When the angle between the main lobe and the principal side lobe is twice that of the angle of tilt, will be seen that the main lobe will always extend over the edges of the region which was occupied by the portion of the side lobe nearest to the axis of spin when the beam was in a diametrically opposite position. This has certain beneficial results which will be later described.

In Fig. 10 a block diagram of the whole apparatus is shown. Most of the various units shown in this diagram have been disclosed in detail in other figures, while some have not, since they are considered to be well-known. Those units which cooperate to produce the semaphore indication used with the spiral scan will first be considered.

Scanning mechanism 34, including antenna system 35—36—37, is fed pulses of high-frequency oscillations from a high-frequency generator 225, which has not been disclosed in detail, but which may be one having a high power output, such as a magnetron. This high-frequency generator is controlled by a pulser 226 which acts to turn the high-frequency generator on and off, so that it produces a sequence of pulses of oscillations and no energy at all is delivered by it between successive pulses.

Pulser 226 has not been shown in detail but comprises some type of square pulse generating circuit the construction and operation of which is understood in the art. Pulser 226 is also arranged to produce a trigger pulse at the time of the inception of the square pulse, which trigger pulse is passed through a suitable delay circuit, included in the pulser circuit, so that it occurs a predetermined time after the square pulse. The purpose of this delayed trigger pulse will appear later.

Pulser 226 is controlled by a blocking oscillator 227 which delivers a sharp positive trigger pulse to the pulser at a predetermined repetition frequency to cause the pulser to initiate the square pulse at the same repetition frequency. Any type of stable oscillator for producing a suitable trigger pulse at a predetermined frequency may be used, as, for instance, the blocking oscillator shown in Fig. 11 comprising tube 228 and associated circuit. Condenser 229 and resistance 230 in the grid circuit of tube 228 have a time constant which determines the period of the trigger pulses produced by the circuit. These pulses, appearing somewhat as indicated at 232 in the figure, are delivered by means of a suitable coupling circuit to an impedance-changing tube 233 which, in this case, is shown as a cathode follower with the output taken across resistance 223 in the cathode circuit. Tube 233 acts as a buffer to prevent the oscillator from being overloaded which would tend to de-stabilize it and thus change the natural frequency of oscillation. It also serves to provide a better impedance match between the oscillator and pulser 226 to which the trigger pulse is delivered. The repetition frequency of the trigger pulses and therefore of the radiated electromagnetic pulses, for the example shown, may be in the neighborhood of several thousand cycles per second.

A receiver 235 is used to receive reflected signals, and in the system chosen to illustrate the invention, a common antenna system is used both for transmission and reception. Hence receiver 235 is shown connected to the antenna system through a suitable switch 236 which may be of the discharge type. This may act automatically to connect the high-frequency generator to the antenna system and to disconnect the receiver when a pulse of oscillations is being produced, and to disconnect the high-frequency generator from the antenna system and connect the receiver thereto between pulses. A switch of this nature is shown and described in the application of James L. Lawson, Serial Number 479,662, filed March 18, 1943.

Receiver 235 has not been shown in detail since it may be of the usual design for receiving energy at the high frequencies used. The energy picked up by the antenna system may or may not be preamplified before being carried to a mixer stage where a lower frequency is produced by a heterodyne effect which has the same envelope as the original higher-frequency echo signal. The signals at this intermediate frequency may then be amplified and passed through a second detector where the envelope is filtered out and amplified in a video amplifier and utilized in a manner to be hereinafter described.

Various parts of the circuit are used for producing the semaphore indication of Fig. 2, while other parts are used for producing the wing indication of Fig. 3, and still other parts are used for both types of indication. The circuit has been provided with a number of switches to be operated when changing over from one type of scanning and indication to the other, but it will be understood that these switches may all be ganged together, so as to be operated simultaneously by means of a single control. In the position in which the switches have been shown in Fig. 10 and in the other figures showing the various circuits in detail, the connections are for the spiral scan and semaphore indication, and it will be understood that all of these switches, with the exception of the main motor control switch 128 of Fig. 6, will have to be reversed in order to produce the circular scan with the wing indication.

For producing the semaphore indication illustrated in Fig. 2 it is necessary to cause the electron beam of cathode ray tube 1 to have a horizontal sweep which will be proportional at all times in magnitude and sense to the horizontal component of displacement of the electromagnetic beam radiating from the antenna system. Cathode ray tube 1 may be arranged for electrostatic or electromagnetic deflection of the electron beam, as desired. In the present instance, electrostatic deflection is used and the cathode ray tube (Figs. 10 and 12), is provided with horizontal deflecting plates 239 and 240 and vertical deflecting plates 241 and 242.

A modulated voltage sine wave under control of potentiometer 197 is used to control an azimuth amplifier 244 (Fig. 10) which delivers the proper voltages in push-pull to horizontal deflection plates 239 and 240. The modulated voltage for this purpose is obtained from terminal 184, shown in Fig. 6. The circuit for azimuth amplifier 244 is shown in Fig. 12 near the bottom of the figure and comprises a differential amplifier with two tubes 245 and 246 having their cathodes connected to the ends of potentiometer winding 247 with arm 248 of the potentiometer connected through resistance 249 to a source of negative potential, indicated at 250. Terminal 184 of Fig. 6 is connected to one end of potentiometer winding 251 the other end of which is connected to ground, so that the voltage delivered from terminal 184 may be adjusted. Arm 252 of the potentiometer is connected through coupling condenser 253 to terminal 254 of switch 255 the arm of which is connected to the grid of tube 245. The grid of tube 246 is connected to the arm of switch 258, one terminal 259 of which is connected through condenser 260 to ground. Grid resistors 261 and 262 are connected between switch terminals 254 and 259, respectively, and source 250 of negative potential. Switches 255 and 258 have other terminals 263 and 264, respectively, which are used when the wing type of indication is used. The plates of tubes 245 and 246 are given a positive potential from a source indicated at 266 through load resistors 267 and 268, the junction of these resistances being connected through bypass condenser 269 to ground.

Thus connected, tubes 245 and 246 form a differential amplifier. When the potential of the grid of tube 245 is made more positive by the voltage wave from winding 177 of generator 175, driven by the scanning mechanism, plate-cathode current in tube 245 increases, causing the cathodes of both tubes 245 and 246 to rise in potential because of the voltage drop in common bias resistance 249. This decreases the potential difference between the grid and cathode of tube 246 so that less space current flows. Thus when the grid of tube 245 is made positive by the positive part of the sine wave, the potential at its anode drops. Correspondingly the potential at anode of tube 246 rises. When the grid of tube 245 is made negative by the negative part of the sine wave, the changes are reversed. Thus, less space current through tube 245 causes a smaller drop in bias resistance 249 which drops the cathode of tube 246 with respect to its grid. This means more space current through tube 246. When the sine voltage wave is applied to the grid of tube 245, the alternating voltage appearing on the plate of tube 246 will be opposite in phase to the voltage appearing on the plate of tube 245. The plate of tube 245 is connected through a resistance 272 to right horizontal deflecting plate 240 of cathode ray tube 1, while the plate of tube 246 is connected through a resistance 273 to left horizontal deflecting plate 239 of the cathode ray tube 1.

By this arrangement the electron beam of the cathode ray tube 1 will be caused to sweep from side to side of the tube, the amplitude of the sweeps increasing as the amplitude of the modulated voltage wave increases, and each cycle causing an initial movement on one side of the center line of the tube and a final movement on the other side as has already been explained in connection with Fig. 1.

Since the voltage wave from terminal 184 is proportional to the cosine of the angle of spin, as already explained, the electron beam will move from side to side of the tube as the electromagnetic beam moves from side to side, and because the potentiometer reduces the amplitude to zero when the tilt angle is zero and increases it to a maximum value when the tilt angle is maximum, the sweep of the electron beam from side to side will follow the cyclically increasing and decreasing radius of the spiral scan. This is the normal horizontal movement of the electron beam without the semaphores which are created under control of the signals from tre receiver in a manner to be explained later.

In Fig. 12 the elements of the cathode ray tube are illustrated more in detail. Heater 224 is shown connected to a source of negative potential, indicated at 231, while cathode 234 is given a more positive potential from a voltage dividing circuit 237 connected between source 231 and ground, the connection to the cathode being through resistance 238. Control grid 243 is also given a suitable negative bias potential with respect to cathode 234 by connecting it through grid resistor 256 to a point on the voltage dividing circuit 237 more negative than that to which cathode 234 is connected. These two points on the voltage dividing circuit may be connected by condenser 238a. First anode 257 may be given a more positive potential on the same voltage dividing circuit 237, as indicated, while second anode 265 may be given a higher positive potential from a source, indicated at 270. Intensifier 271 is given a high positive potential from a source of potential indicated at 274. It will be understood that the various potentials on the elements of the cathode ray tube 1 will be adjusted so that a concentrated beam of electrons will be focused to a point on the face of the tube and the beam will be controlled by deflecting plates 239, 240, 141, and 242, already described.

The normal vertical sweeps of the electron beam from lower base line 24 (Fig. 2), to upper line 25 on the face of the tube are produced by a vertical sweep generator 275 (Fig. 10), the circuit for which is shown in the middle of Fig. 12. This circuit is controlled by a primary gate circuit 276 shown at the upper left corner of Fig. 12. Primary gate 276 comprises a modified multivibrator or flip-flop circuit having two conditions of operation, one of which is a normal or balanced condition. By means of a trigger pulse the circuit may be made to change suddenly to its other condition of operation, whereupon it will automatically change back again after a predetermined time limit. Positive and negative square pulses are produced by this circuit, the latter to control sweep generator 275 and the former to control receiver gate circuit 277 and an intensifying gate for the cathode ray tube as will later appear.

As shown, primary gate circuit 276 has two tubes 278 and 279 which are coupled together, with the plate of tube 278 connected to the grid of tube 279 through a resistance 280 shunted by condenser 281. The plate of tube 279 is connected through condenser 282 back to the grid of tube 278. Pulser 226 delivers a negative pulse to the grid of tube 278 through coupling condenser 283, and the grid is connected through grid resistor 284 to the arm of potentiometer 285 the resistance of which is connected between ground and a source of positive potential, indicated at 286. This maintains a suitable positive bias on the grid. The potentiometer end of resistor 284 is connected to ground through by-pass condenser 287.

The plate of tube 278 is connected to a source of positive potential, indicated at 289, through resistor 278a the midpoint of which is grounded for high-frequency components through condenser 289a. The cathode of tube 278 is connected to ground through resistance 280a. The plate of tube 279 is connected through resistance 279a to a source of positive potential, indicated at 281a. The grid of tube 279 is connected through resistance 282a to a negative source of potential, indicated at 283a. Resistances 278a, 280 and 282a form in effect a voltage dividing circuit between the positive source of potential at 289 and negative source of potential 283a which helps to stabilize the circuit by maintaining a constant bias potential on the grid of tube 279.

When a negative trigger pulse from pulser 226 drives the potential on the grid of tube 278 negative, this tube will shut off, and the increased potential of the plate of the tube will drive the grid of tube 279 positive, the potential being transmitted through condenser 281. This causes tube 279 to conduct, and reduces the plate potential. This drop is transferred onto the grid of tube 278 through condenser 282 and makes this grid more negative. The cumulative action produces a square wave output with the grid of tube 278 driven far below cut-off.

Condenser 282 is normally charged, since it is connected in a circuit including source of potential 281a, resistance 279a, grid resistance 284, and a part of potentiometer resistance 285 between the arm and ground. When tube 279 starts to conduct, it effectively shorts one side of condenser 282 to ground through tube 279, and the condenser starts to discharge through resistance 284 and the portion of potentiometer resistance 285 between the arm and ground. The time constant of this circuit, which may be adjusted by means of potentiometer 285, is such as to permit the potential of the grid of tube 278 to rise above its cut-off potential after a predetermined time has elapsed, whereupon tube 278 will start to conduct again which will reverse the action, causing the reduced plate potential of tube 278 to reduce the potential of the grid of tube 279 and cut that tube off. The circuit will operate thus every time a negative pulse from the pulser is delivered to the grid of tube 278.

A negative square pulse will be produced on the plate of tube 279 as this tube goes on and off. Likewise a negative square pulse will be produced on the cathode of tube 278 as this tube is turned off and then comes on again. The former pulse is used to control vertical sweep generator 275, while the latter is used to control the sensitivity of the cathode ray tube in a manner to be later described.

A positive square pulse is produced on the plate of tube 278 and by means of a circuit to be later described is caused to form a trapezoidal pulse with a sloping front which is used to control receiver gate circuit 277 in a manner to be later described.

The negative square pulse on the plate of tube 279 is all that is necessary in the present instance to operate vertical sweep generator 275 (middle of Fig. 12). This pulse is delivered through a coupling condenser to the grid of a double-saw-tooth generator tube 290 forming part of vertical sweep generator 275. This tube has a variable plate resistance 291 and a variable cathode resistance 292. The tube is normally conducting because of a negative bias on cathode and is shut-off when the negative square pulse is received on the grid. Condenser 293 is provided between the plate of the tube 290 and ground and another condenser 294 is provided between the cathode of tube 290 and ground. When tube 290 is shut-off by the negative pulse, the plate rises in potential gradually as condenser 293 is charged, thus forming a positive saw-tooth pulse which will appear somewhat as indicated at 295. At the same time the drop in potential of the cathode as the tube is shut-off charges condenser 294 negatively so that the cathode falls in potential as condenser 294 is charged and produces negative saw-tooth pulse 296.

The plate of tube 290 is coupled through a coupling condenser 296a to the grid of amplifier tube 297, while the cathode of tube 290 is coupled by condenser 298 to the grid of amplifier tube 299. The cathodes of tubes 297 and 299 are connected together and to terminal 300 of a switch 301 and also through a bias resistance 302 to ground. Switch 301 merely acts to short circuit resistance 302 when the wing indication is used, but for producing the spiral scan and semaphore indication it is in the position indicated where it has no effect on the circuit. The grids of tubes 297 and 299 are negatively biased through grid resistors 305 and 306 respectively. The plates of tubes 297 and 299 are connected respectively through plate resistances 307 and 308 to a source of positive potential, indicated at 309.

Thus connected, a negative saw-tooth pulse will appear on the plate of tube 297 and a positive saw-tooth pulse will appear on the plate of tube 299 each time the trigger pulse is delivered to primary gate circuit 276 from pulser 226. The time duration of these saw-tooth pulses will be determined by the time duration of the negative square pulse produced by primary gate circuit 276. These saw-tooth pulses are delivered respectively to lower vertical deflection plate 242 and upper vertical deflection plate 241 of cathode ray tube 1, through coupling condensers 310 and 311. Between the coupling condensers and the vertical deflection plates are switches 312 and 313. Switch 312 has terminal 314 connected to condenser 310 and the switch arm is connected directly to lower vertical deflection plate 242. When the switch is in the position indicated, the negative saw-tooth pulse will be delivered to the lower deflecting plate. Similarly switch 313 has terminal 315 connected to condenser 311, the switch arm being connected directly to upper deflecting plate 241, and when the switch is in a position indicated in the drawing, the positive saw-tooth pulse is applied to the upper deflecting plate. Switches 312 and 313 have additional contacts 316 and 317 respectively which are connected to two output circuits of elevation error amplifier 320 (Figs. 10 and 15) which controls the vertical position of the electron beam when the circular scan and wing indication is used and the circuit for which will be described later.

Terminals 314 and 315 are also connected respectively by means of wires 321 and 322 respectively to the two outputs of the circuit for producing the vertical component of the semaphore which is indicated as 303 on the block diagram of Fig. 10. In order to prevent the action of this circuit 303 from upsetting the linearity of the saw-tooth pulses produced on the plates of tubes 297 and 299, filters are provided between condensers 310 and 311 and the connections with wires 321 and 322. These filters comprise inductance 325 shunted by resistance 326 for the former circuit and inductance 327 shunted by resistance 328 for the latter circuit. The components of these filters are so chosen as to prevent the high-frequencies contained in the voltage pulse for the vertical component of the semaphore, which will be later described, from passing through them, but will permit the saw-tooth pulse for the normal vertical sweep to pass through.

The vertical sweep may be centered on the face of tube 1 by means of bias potentials applied to vertical deflecting plates 241 and 242. To this end contact 315 is connected to a source of positive potential, indicated at 329, through resistance 330 and to ground through resistance 331, while the source of potential 329 is connected through a portion of potentiometer 332 to ground, the arm of the potentiometer being connected through resistance 333 to contact 314. By means of this network, positive potentials may be maintained on contacts 314 and 315 and these potentials may be adjusted by adjusting the arm of potentiometer 332. This will act to center the vertical sweep on the face of the cathode ray tube, as will be understood.

As thus far described, the electron beam of the cathode ray tube will sweep from side to side in proportion to the horizontal movement of the electromagnetic beam and at the same time will make rapid vertical sweeps from the lower edge of the face of the tube to the upper edge thereof each time a pulse of electromagnetic radiation is transmitted. The reason a separate trigger pulse from pulser 226 is used to initiate the vertical sweep of the electron beam, instead of the trigger pulse from the blocking oscillator 227, is that there may be a slight time delay between the trigger pulse from the blocking oscillator 227 and the actual radiation of the pulse of wave energy from the antenna system. Pulser 226 is therefore arranged to deliver the pulse to primary gate circuit 276 at a time which will compensate for this delay and thus come a little later than the pulse from blocking oscillator 227, to cause the start of the vertical sweep to coincide with the pulse of electromagnetic radiation. This is a well known expedient in this art.

Generation of semaphores

In order to produce semaphore 23 of Fig. 2, it is necessary to provide an additional vertical component of force to the electron beam which is proportional to the elevation of the object producing the reflected signal and in addition a horizontal component of force, both of these forces being applied so as to produce movement of the electron beam at a much higher speed than the normal speed of movement of the electron beam, so that the beam will temporarily leave its normal path of movement and move at an angle to its normal path and return again to its normal path before completing the vertical sweep. This is caused to happen each time a signal is received from radiation reflected from an object in space.

In accordance with the operation of the semaphore indication, no light appears on the face of the tube except in response to reflected radiation acting on receiver 235. The vertical sweep of the electron beam on the face of the cathode ray tube and the bellows-like movement of the displacement horizontally of this vertical sweep may be entirely invisible, owing to the bias of the control grid of the cathode ray tube.

This normal bias of the control grid of the cathode ray tube, as provided by voltage divider circuit 237, makes the control grid sufficiently negative with respect to cathode 234 so that signals from the receiver applied to the control grid will not be sufficient to intensify the beam enough to produce a light spot on the face of the tube. However, primary gate circuit 276 (Fig. 12), applies a negative pulse to cathode 234 of the cathode ray tube which is sufficient to reduce the potential difference between control grid 243 and cathode 234, so as to permit signals from the receiver to intensify the electron beam to produce the visible trace.

The negative pulse for this purpose is taken from the cathode of tube 278 in the primary gate circuit 276. Switch 212 has an arm adapted to engage a contact 213 which is connected to the cathode of the tube 278. The arm of switch 212 is connected by wire 214 (not shown in its entirety), through coupling condenser 221 to cathode 234 of cathode ray tube 1. Switch 212 is also provided with another contact 222 which is connected through condenser 223 to the grid of tube 279. For producing the semaphore indication the switch is in the position shown, during which time the negative pulse from the cathode of tube 278 is delivered to cathode 234 of cathode ray tube 1. When the switch is in the other position a different effect is obtained which will be explained later in connection with the wing indication.

Since the negative pulse produced by primary gate circuit 276 is equal in time duration to the vertical sweep saw-tooth pulses which produce the vertical sweep, it will be seen that the signal can intensify the electron beam of the cathode ray tube sufficiently to produce light on the surface of the tube only during the time of the vertical sweep when cathode 234 is held negative by the negative pulse from primary gate 276. This insures that there will be no visibility of the electron beam except during the time of the vertical sweep. The response of receiver 235 acts not only to raise the potential of control grid 243 of cathode ray tube 1 so as to cause the electron beam to produce a sharply focused spot of light on the face of the tube, but also to control circuit 303 (Fig. 10), for producing the vertical component of the semaphore, which has been explained is connected to the output of vertical sweep circuit 275, and to control circuit 338 for producing the horizontal component of the semaphore. To accomplish these results the output of receiver 235 is connected to video driver 340 which is shown as a single tube at the extreme bottom of Fig. 12. The output of receiver 235 is connected through coupling condenser 341 to the control grid of tube 340, this grid being biased from a source of negative potential, indicated at 342, through grid resistor 343. The tube is operated as a cathode follower with the plate connected to a source of positive potential, indicated at 345, through plate resistor 346, the plate being by-passed to ground through condenser 344.

The cathode is connected through the resistance of potentiometer 347 to ground. The arm of potentiometer 347 is connected directly through coupling condenser 348 to control grid 243 of cathode ray tube 1. A small condenser 349 is also connected between the arm of the potentiometer and the cathode of tube 340.

A signal from receiver 235 will consist of voltage variations caused by electrical noise, appearing somewhat as indicated at 352, and positive pulses, indicated at 353, produced by the reflected radiation. These positive signals, will produce positive signals on the cathode of tube 340 which are applied to control grid 243 of cathode ray tube 1 through coupling condenser 348, and the strong positive pulses 353 will intensify the electron beam sufficiently to cause it to produce light traces on the face of the tube as the beam moves.

Switch 354 is also connected to the cathode of tube 340 and is adapted to engage one of two contacts, 355 and 356. Contact 355 is connected through resistance 357 to ground, and the midpoint of this resistance is connected by means of a wire 358 to two circuits 303 and 338 (Figs. 10 and 13), for producing, respectively, the vertical component of the semaphore and the horizontal component of the semaphore. Contact 356 is connected by wire 359 to detector and amplifier circuit 362, shown in the block diagram of Fig. 10 and in detail in Fig. 15. This circuit is used in a manner to be hereinafter described to control the position of the electron beam of the cathode ray tube for wing indication. When switch 354 is engaging contact 355, as indicated in Fig. 12, the connection is made for the semaphore indication which is used with the spiral scan.

Circuit 303 for producing the vertical component of the semaphore and circuit 338 for producing the horizontal component are closely allied and are shown in Fig. 13 as comprising three pentode tubes 364, 365, and 366, the two former tubes representing circuit 303 and tube 366 representing circuit 338. Tube 364 has its cathode connected to ground, while its plate is connected through a low-pass filter comprising inductance 367 shunted by resistance 368 and through resistance 369 to a source of positive potential indicated at 370. Similarly, tube 365 has its cathode connected to ground, while its plate is connected through a low-pass filter comprising inductance 372 shunted by resistance 373 and to source of potential 374 through resistance 375. In the same manner tube 366 has its cathode connected to ground, while its plate is connected through a low-pass filter comprising inductance 376 shunted by resistance 377 to a source of positive potential indicated at 378, through resistance 379. The screen grids of tubes 364, 365, and 366 are connected together and to a suitable source of positive potential, indicated at 382. The control grids of these tubes are also connected together and receive the signal from video driver 340 by means of wire 358 through coupling condenser 383.

The suppressor grids of tubes 364, 365, and 366 are given separate bias potentials from a network comprising resistance 385 connected to a suitable source of negative potential, indicated at 386, and resistance 387 connected to ground, and parallel branch resistors 388, 389 and 390 which are connected between resistances 385 and 387. Resistances 388, 389, and 390 may form potentiometer resistances the arms of which are connected respectively to the suppressor grids of tubes 364, 365, and 366, the first through resistance 391, the second through resistance 392.

The control grids of tubes 364, 365, and 366 are also biased by connecting them through resistance 395 to the arm of potentiometer 396 the resistance of which is connected between a source of negative potential indicated at 397 and ground. The arm of the potentiometer is also connected to ground through by-pass condenser 398. By means of this biasing arrangement, tubes 364, 365, and 366 are operated beyond cut-off sufficiently so that the noise background of the signal (indicated at 352 at the bottom of Fig. 12) is eliminated, the tubes responding only to positive pulses 353 resulting from radiation reflected by targets.

The square pulses applied to the grids of tubes 364, 365, and 366 cause these tubes to conduct during the period of each pulse, but the filter circuits in the plate circuits of these tubes, comprising inductance-resistance combinations 367—368, 372—373, and 376—377, filter out the high frequency components of the square pulse and reduce it to a modified saw-tooth pulse, so that a negative saw-tooth pulse appears at each of the points 400, 401, and 402 in the plate circuits, respectively, of tubes 364, 365, and 366 for the period of each signal pulse. The pulses are shown as linear saw-tooth waves for convenience, but will actually often depart from this ideal shape. Points 400 and 401 are connected respectively through coupling condenser 403 and 404 to wires 322 and 321 which are connected to switch contacts 315 and 314 of vertical sweep generator 275 (Fig. 12). Point 402 is connected through coupling condenser 405 to wire 406 which is connected to contact 407 of switch 408 (Fig. 12), the arm of the switch being connected to left horizontal deflecting plate 239 of cathode ray tube 1 through two condensers 409 and 409a. These condensers have no function except to pass the saw-tooth pulse to the deflecting plate, as far as the semaphore indication is concerned, but do perform a particular function when the wing indication is used and this function will be explained later in connection with the wing indication. Switch 408 is in the position shown in Fig. 10 for the spiral scan and semaphore indication and applies the negative saw-tooth pulse which is proportional to the signal and which is produced by circuit 338 directly to the left horizontal deflecting plate.

At the same time, the negative saw-tooth pulses also produced by the effect of the signal of tubes 364 and 365 constituting circuit 303 for producing the vertical component of the semaphore are applied by means of wires 322 and 321 and switches 313 and 312 to the upper and lower vertical deflecting plates, as indicated in Figs. 10, 12, and 13. Without additional modulation of the saw-tooth pulses produced at points 400 and 401 by tubes 364 and 365 and the associated circuits there would be no effect on the electron beam of the cathode ray tube because the negative saw-tooth pulses at these two points would be equal in magnitude at all times and are applied to opposite deflecting plates. However, the magnitude of these pulses is changed approximately in proportion to the elevation of the electromagnetic beam as directed by antenna system 35—36—37. In order to accomplish this an elevation phase splitter 410 (Figs. 10 and 13) is used comprising tubes 411 and 412. The cathodes of these tubes are connected together and to a source of negative potential, indicated at 413, through resistance 414. The control grid of tube 411 is connected to the arm of potentiometer 415, the resistance of which is connected between ground and terminal 193 upon which the variable voltage sine wave which is produced by winding 178 of generator 175 under control of potentiometer 196 of Fig. 6 is impressed. This voltage wave from winding 178, as has already been explained, is proportional as to instantaneous value to the sine of the angle of spin and is modulated according to the angle of tilt by the potentiometer. The control grid of tube 412 is connected to ground. The plate of tube 411 is connected through resistances 416 and 417 to a source of positive potential, indicated at 418. In like manner, the plate of tube 412 is connected through resistances 419 and 420 to the same source of potential 418. The junction of resistance 416 and 417 is connected through coupling condenser 421 to the suppressor grid of tube 364, while the junction of resistances 419 and 420 is connected through coupling condenser 422 to the suppressor grid of tube 365.

When a sine wave voltage is applied to the control grid of tube 411, sine wave voltages equal in amplitude but opposite in phase will appear on the plates of tubes 411 and 412 because of the common cathode connection of the tube, and will be applied through coupling condensers 421 and 422 to the suppressor grids of tubes 364 and 365, respectively. When the voltages from the plates of two tubes 411 and 412 are equal in magnitude, the negative saw-tooth pulses produced at points 400 and 401 will be equal; if the potential on the plate of tube 411 is more positive than that on the plate of tube 412, then the negative saw-tooth pulse produced at point 400 will be greater in magnitude than that produced at point 401; if the potential of the plate of the tube 411 is more negative than that of the plate of tube 412, the magnitude of the negative saw-tooth pulse produced at point 400 will be less than that of the negative saw-tooth pulse produced at point 401.

It will be understood that the saw-tooth pulses produced at points 401 and 400 occupy a very small increment of time, since they are determined by the width or time duration of the radiated electromagnetic pulse, while the variation in potential on the suppressor grids of tubes 364 and 365 is relatively slow, being determined by the scanning movement of the electromagnetic beam. The entire saw-tooth pulse will therefore be formed without any material change of suppressor grid voltage.

The auxiliary vertical deflection of the electron beam in the cathode ray tube for producing the semaphore will thus be determned by the difference in magnitude between the two negative saw-tooth pulses produced at points 400 and 401 and this difference will be determined by the vertical position of the electromagnetic beam as it scans the field. The horizontal movement of the electron beam to produce the semaphore is determined, on the other hand, solely by the magnitude of the received signal.

Since the electron beam of the cathode ray tube is normally sweeping from the reference line at the bottom of the tube towards the top when the reflected signal is received, which signal produces the semaphore, it is necessary to arrest the normal movement of the electron beam, so that it can produce the semaphore indication before resuming its normal movement. This is done by connecting point 402, upon whch is a negative saw-tooth pulse determined solely by the magnitude of the signal received, to upper vertical deflecting plate 241 by connecting this point through coupling condenser 424 of small capacity to wire 322. The small amount of negative saw-tooth pulse thus delivered to the vertical deflecting plate from tube 366 is arranged to be of such a value that the normal vertical sweep motion of the electron beam is completely arrested for the duration of signals which are sufficiently strong to saturate tube 366. This will occur when the target is at close range. When the target is farther away, so that the signal is weaker, some error will be introduced, since the normal movement of the electron beam will not be completely arrested, but this error will not be objectionable, since great accuracy is desired only at short range.

With the arrangement thus far described the electromagnetic beam produced by antenna system 35—36—37 will scan in the spiral path already described, yoke 51 rotating continuously at a constant speed about the spin axis, while reflector 36 and associated parts will rock more slowly about the tilt axis in the manner described. At the same time the electron beam of the cathode ray tube will move in a series of vertical sweeps, each sweep corresponding to a pulse of the transmitted electromagnetic radiation, and the horizontal deflection of these sweeps will vary in a bellows-like action following the horizontal movement of the electromagneitc radiation. When radiation is reflected from an object in space, the vertical movement of the electron beam in the cathode ray tube will be arrested and the beam will be caused to move a short distance towards the right of the tube (as shown in Fig. 2), the magnitude of the received signal determining the horizontal component of this short movement, while the approximate elevation angle of the electromagnetic beam together with the magnitude of the received signal will determine the vertical component. During the time of this auxiliary semaphore excursion of the electron beam, the beam is intensified by the action of video driver 340 on control grid 243 of cathode ray tube I which occurs during the time that the bias of this grid is effectively reduced by the negative pulse from primary gate circuit 216. The electron beam will thus be caused to make a spot of light on the face of the tube which will be drawn out by the short angular excursion of the beam into a bright semaphore line for each signal received, as shown in Fig. 2.

The angle of the semaphore produced by this type of indication does not give an absolutely accurate indication of the elevation. This is because the azimuth voltage wave does not depend entirely upon the azimuth angle of the electromagnetic beam but is affected slightly by the instantaneous position of the electromagnetic beam in elevation. Likewise the elevation sine voltage does not depend entirely upon the elevation position of the electromagnetic beam but is affected slightly by the instantaneous azimuthal position of the beam. For this reason the semaphores appearing on the face of the cathode ray tube will be somewhat distorted from an absolutely accurate position. However, the type of distortion introduced is not at all serious for the particular use of the spiral scan and semaphore indication described. The spiral scan and semaphore indication are used only for search purposes and an approximate location of the various objects will be sufficient except when the object is at the center or near the center of the field of scan. It so happens that the inaccuracy introduced in the manner just referred to decreases as the object in space approaches the center of the field of scan in a vertical direction and the angle of the semaphore approaches the horizontal. When it is in the horizontal position, there will be no error introduced because of the fact that the only force additional to the cosine wave acting upon the beam to move it sideways in the cathode ray tube is that produced by the signal itself which applies the saw-tooth pulse to horizontal deflecting plate 239 of the tube. It is when the semaphore appears at the center of the cathode ray tube that it is desired to make the changeover to the circular scan and wing indication, and the accuracy of the semaphore at this time has been found to be more than sufficient to cause the representation of the object to appear near the center of the indicating device after the switch-over occurs.

No two semaphore lines produced by successive signals reflected back from the same object, as the electromagnetic beam sweeps across it, are produced with the electromagnetic beam in the same azimuth position or elevation position, and hence the several adjacent lines will be different in position as well as slope. This may produce a blurring effect, but, in spite of this grouping of the lines, large angles are quite easy to estimate and as the angle approaches the horizontal the several lines become more nearly superposed and thus the angle becomes more clearly defined, until, when the semaphores are horizontal, they are all superposed and a clean, distinct semaphore line is produced.

In order to produce straight semaphore lines of uniform brightness linear saw-tooth pulses on circuits 303 and 338 would be necessary. However, straight line semaphores are produced with voltage pulses having other forms, as long as the vertical and horizontal pulses were the same shape and phase, and only the brightness will vary somewhat.

The semaphore indication described above provides an inherently high signal-to-noise ratio, because the electron beam is moving at high speed in making its vertical sweep and indications produced by noise are spread out over the face of the tube at random, have varying lengths, and are rarely if ever grouped together, so that they may be distinguished from the indications produced by the signals.

Wing indication for circular scan

The wing indication of Fig. 3 used with the circular scan differs considerably in the manner of its control from the semaphore indication just described. For the wing indication it is necessary to maintain the electron beam at a more or less fixed position in the cathode ray tube, except for the wing-producing movement of the beam, which position will be determined by the position of a particular object or target in space. With the circular scan of the electromagnetic beam it will be understood that when the object or target is on the spin axis, a reflected signal strong enough to produce a response in the apparatus will be received from the target for each pulse of electromagnetic radiation, as long as the target is within range of the apparatus. Since the target will always lie in substantially the same portion of the energy distribution pattern as the beam revolves symmetrically, the magnitude of the successive signals, received by reflection from the target, will be substantially uniform and will only change gradually as the range of the target changes. If the target is off the spin axis of the circular scan, the magnitude of the received signals will increase as the electromagnetic beam approaches the target and will decrease as the electromagnetic beam moves away from it. Thus, for centrally displaced positions of the target, the signal comprising a continuous sequence of pulses will be amplitude-modulated at the frequency of revolution of the electromagnetic beam and an alternating error signal wave will thus be produced, having, as a fundamental component, a sinusoidal wave at the spin frequency the phase of which will be determined by the position of the target above or below or to the left or the right of the spin axis of the circular scan. The error signal thus contains information as to the instantaneous direction of the electromagnetic beam at the instant when maximum signals are received.

The phase angle may be measured by comparing the error signal voltage with the reference sine wave voltages produced by generator 175 which is rotated at the same speed as the scanning machanism, giving these voltages the spin frequency. For this purpose an elevation commutator 425 and an azimuth commutator 426 are used. These are shown in Figs. 10 and 15 and are similar to the circuits shown in the application of Louis N. Ridenour, Serial No. 516,299 filed December 30, 1943, Patent No. 2,473,175 dated June 14, 1949. Elevation commutator 425 is a phase-sensitive rectifier, also sensitive to amplitude variations, and comprises two tubes 427 and 428 and associated transformers 429 and 430. The elevation voltage sine wave from terminal 190 (Fig. 6), associated with winding 178 of generator 175, and which voltage wave is now at constant amplitude, because arm 198 of the potentiometer 195 is in a fixed position on resistance 196, is applied as a reference potential across primary winding 431 of transformer 429. One end of this primary winding is connected, as shown, to terminal 190, while the other end is connected to ground. Resistance 432 may be connected across primary winding 431 for the purpose of improving the shape of the sine wave. The ends of secondary winding 433 of transformer 429 are connected to the cathodes of tubes 427 and 428, while midpoint 434 of secondary 433 is connected to one end of secondary 435 of transformer 430. The other end of secondary winding 435 is connected through resistance 436 to the plate of tube 427 and through resistance 437 to the plate of tube 428.

Tubes 427 and 428 are used as rectifier tubes. Three element tubes have been shown in the drawing, but in each case the grid is connected to the plate so that both grid and plate act together as an anode. Filter condenser 438 is connected between the junction of resistances 436 and 437 and ground, and filter condensers 439 and 440 are also connected between this point and the plates of tubes 427 and 428, repectively.

The plate of tube 427 is also connected through resistance 444 to the grid of amplifier tube 445 and the plate of tube 428 is also connected through resistance 446 to the grid of amplifier tube 447. Amplifier tubes 445 and 447 and associated circuit constitute elevation error amplifier 320. The grids of tubes 445 and 447 are also connected through grid resistors 448 and 449, respectively, to a source of negative potential, indicated at 450, through another resistor 451. Filter condensers 452 and 453 are also connected respectively between the grids of tubes 445 and 447 and ground. The cathodes of tubes 445 and 447 are connected together through a resistance of potentiometer 454, the arm of which is connected through resistance 455 to the junction of resistances 448 and 449. The plates of tubes 445 and 447 are connected together through resistance 456, the midpoint of which is connected to a suitable source of positive potential, indicated at 457. The plates of tubes 445 and 447 are also connected respectively to terminals 316 and 317 which are contacts of switches 312 and 313, respectively, shown at the center in Fig. 12, the arms of these switches being connected, respectively, to the lower and upper vertical deflecting plates of cathode ray tube 1.

The fundamental error voltage sine wave component deriving its frequency and phase from the displacement of the target from the center of the circular scan is obtained by means of a detector and amplifier circuit 362, shown in Figs. 10 and 15. The detector circuit comprises tube 460 connected substantially as an infinite impedance detector, upon the grid of which a signal from the video driver is applied. To this end the grid is connected through coupling condenser 461 by wire 359, to contact of switch 354 shown just below video driver 340 of Fig. 12. The grid is also connected to ground through grid resistance 462. The plate of tube 460 is connected to a source of positive potential, indicated at 463, through resistance 464, the plate being also connected through a by-pass condenser 465 to ground. The cathode of tube 460 is connected to ground through resistance 466 and also to a filter circuit comprising series resistances 467 and 468 and condensers 469, 470, and 471, connecting respectively the cathode, the junction of resistances 467 and 468, and the other end of resistance 468 to ground. This end of resistance 468 is also connected through condenser 472 to one end of potentiometer 473, the other end of the potentiometer being connected to a suitable negative source of potential, indicated at 474, and the arm of the potentiometer being connected to the grid of amplifier tube 475. The plate of tube 475 is given a positive potential from a source, indicated at 478, through resistance 479, while the cathode of the tube is grounded. The output of tube 475 from the plate thereof is delivered through coupling condenser 480 to one end of primary 481 of transformer 430 the other end of which primary is connected to ground.

When switch 354 in the cathode circuit of video driver 340 (Fig. 12) is thrown for wing indication in engagement with contact 356, it will be seen that the plate-cathode current of tube 340 will all flow through resistance 347, instead of flowing partly through resistance 357 which is in parallel with resistance 347 when switch 354 is in the other position in engagement with contact 355. The values of these resistances are such that the time constant of the cathode circuit is increased when the switch is thrown into engagement with contact 356, so as to have a value several times that of the time period of the signal pulse.

The modulated signal from the cathode of video driver 340 is thus applied to the grid of tube 460 (Fig. 15), and this tube, operating in conjunction with the filter circuit connected to the cathode thereof, acts to remove the higher frequency components of the signal, including the pulse frequency, leaving only the envelope of the signal which is the error voltage wave at the frequency of revolution of the electromagnetic beam, and this remaining error voltage wave is applied to the grid of tube 475. This tube amplifies the error voltage wave and applies it across primary 481 of transformer 430.

The elevation reference sinusoidal voltage wave at the spin frequency is thus applied to primary 431 of transformer 429, while the error signal voltage wave, the phase of which is determined by the angular position of the target about the spin axis of the circular scan and the amplitude by the displacement of the target from the spin axis, is applied to primary 481 of transformer 430. The elevation reference voltage induced across secondary winding 433 will cause current to flow through rectifier tube 427 for one-half cycle and current to flow through rectifier tube 428 during the other half-cycle. However, because of the connection at midpoint 434 of secondary winding 433, the error voltage from tube 475 will cause current to flow through both tubes 427 and 428 during one-half of the error voltage cycle and no current to flow during the other half. The flow of current through tubes 427 and 428 will produce potential differences across resistances 436 and 437, the ends of the resistances adjacent the plates of the associated tubes being negative and the junction of the resistances being positive. These potential differences will cause current to flow in the circuit including resistances 436 and 437 and resistances 446, 449, 448, and 444, the direction and magnitude of the current being dependent on the algebraic sum of the potentials across resistances 436 and 437. Filter condensers 439, 440, 452, and 543 will filter out the voltage variations at the spin frequency, leaving a substantially constant current flow, the direction and magnitude of which will be determined by the amplitude and phase of the elevation error voltage. This will place opposite potentials on the grids of tubes 445 and 447, as long as there is an error voltage, the phase of that voltage determining which of the grids is positive and which negative and the amplitude of the error voltage determining the potential difference between them.

Filter condensers 439, 440, 452, and 453 act to filter out all voltage variations at the spin frequency and higher frequencies, thus maintaining the potentials on the grids of tubes 445 and 447 constant, subject only to changes caused by changes in phase or amplitude of the error signal. When the target is on the spin axis of the circular scan there will be no error signal voltage wave at the spin frequency applied to the grid of tube 460, but only a voltage wave at the pulse frequency, since each pulse will provide a received signal. The pulse frequency will be filtered out and hence the signal from tube 460 will have no effect on tubes 445 and 447 which will then have equal potentials applied on the grids thereof. Since these tubes control the vertical deflection of the cathode ray tube, the electron beam thereof will remain somewhere on a plane extending horizontally through the center of the tube.

If, however, the target is above the spin axis of the circular scan, there will be a signal voltage at the spin frequency and the phase will be such as to produce a positive potential on the plate of tube 447 and a negative potential on the plate of tube 445, the difference in potential being dependent on the amplitude of the error signal and the particular phase angle. This will cause the electron beam in cathode ray tube 1 to move upwardly with respect to the horizontal plane through the center of the tube by an amount proportional to the amplitude of the error signal and the particular phase angle. Similarly, if the target is below the spin axis of the circular scan, an error signal voltage will be produced at a phase which will cause the plate of tube 445 to become positive and that of tube 447 to become negative, the potential difference being dependent on the amplitude of the error signal and the particular phase angle. This will cause the electron beam of cathode ray tube 1 to move downwardly with repect to the horizontal plane through the center of the tube by an amount proportional to the amplitude of the error signal and the particular phase angle.

Azimuth commutator 426 (Figs. 10 and 15), supplies potentials to horizontal deflecting plates 239 and 240 of cathode ray tube 1 so as to move the electron beam of the tube to correspond to the horizontal or azimuth position of the target with respect to the spin axis of the circular scan. This commutator comprises two tubes 484 and 485 which are connected in a phase-sensitive rectifier circuit similar to the circuit of tubes 427 and 428 of elevation commutator 425. The cathodes of tubes 484 and 485 are connected across secondary winding 486 of transformer 487 primary winding 488 of which is connected to terminal 181 of the circuit of generator 175, shown in Fig. 6. This terminal has a sinusoidal voltage wave upon it of constant amplitude, since potentiometer arm 199 is fixed with respect to resistance 197, this voltage being proportional to the cosine of the angle of spin and therefore representing the horizontal or azimuth voltage. Thus, the reference voltage wave for the azimuth commutator circuit is 90° out of phase with the reference voltage wave for the elevator commutator. Primary winding 488 may be shunted by resistance 489 in order to improve the shape of the sine wave, and resistance 490 may be connected between the primary winding 488 and terminal 181. The other end of primary winding 488 is connected to ground, as shown.

The signal is introduced to the circuit by connecting one end of primary winding 492 of transformer 493 to the plate of amplifier tube 475 through coupling condenser 494 and the other end to ground. Secondary winding 495 has one end connected, similarly to the elevation commutator circuit, to the midpoint of primary winding 486. The other end of secondary winding 495 is connected to the plates of tubes 484 and 485 through resistances 496 and 497, respectively, and the junction of resistances 496 and 497 is connected to ground through condenser 498. Filter condensers 499 and 500 are connected respectively across resistances 496 and 497. The plate of tube 484 is connected through resistance 501 and resistance 502 to contact 263 of switch 285, shown in the circuit of azimuth amplifier 244 in the lower portion of Fig. 12. The plate of tube 485 is connected through resistances 503 and 504 to contact 264 of switch 258, shown in azimuth amplifier circuit 244 of Fig. 12. A filter condenser 508 is connected between the junction of resistances 501 and 502 and ground, while another filter condenser 509 is connected between the junction of resistance 503 and 504 and ground. A resistance 510 is connected in series with another resistance 511 between two contacts 263 and 264, and the junction of these resistances is connected to a source of negative potential indicated at 512.

Azimuth commutator circuit 426 operates similarly to elevation commutator circuit 425 explained above, the error signal voltage being compared with a reference voltage. But in this case the reference voltage is the azimuth voltage wave which is 90 degrees out of phase with the elevation voltage wave and the circuit may therefore be used to control the horizontal movement of the electron beam in the same manner as the circuit of 425 controls the vertical movement of the beam.

It will be noticed that tubes 245 and 246 in azimuth amplifier 244 (Fig. 12), serve the dual purpose of controlling the horizontal deflection of the electron beam of the cathode ray tube for both semaphore and wing indication under control of switches 255 and 258. When switches 255 and 258 of circuit 244 (Fig. 12) are in engagement with contacts 263 and 264 for wing indication, the constant potentials produced by the phase-sensitive rectifier circuit of tubes 484 and 485 will produce potentials on contacts 263 and 264 which will be determined by the phase difference between the azimuth reference voltage wave, as applied to primary winding 488 of transformer 487, and the error signal voltage wave, as applied to primary winding 492 of transformer 493 and the amplitude of the error signal. If the target is on the spin axis of the circular scan, then there will be no signal delivered to the primary of transformer 493 at the spin frequency and hence the potentials on contacts 263 and 264 will be equal and the electron beam will have no force tending to move it either to one side or the other and will therefore remain in a vertical plane through the center of the tube. However, if the target is displaced from the spin axis of the circular scan towards the left side, for instance, the potential of contact 263 will be more positive than the potential of contact 264 and the result will be that the electron beam will be maintained on the left side of the center line on the face of the cathode ray tube. If, however, the target is displaced to the right of the spin axis of the circular scan, then contact 264 will be more positive than contact 263 and the electron beam will be maintained to the right of the center line on the face of the tube.

The deflection of the electron beam of the cathode ray tube is approximately proportional to the displacement of the target from the spin axis of the circular scan only for small displacements, because the shape of the energy distribution pattern is such that the signal strength begins to fall away again as the target gets out beyond the path of the axis of the electromagnetic beam (in this instance, 3° either way), but this is not important, because the operator is interested only in keeping the target on the spin axis of the circular scan and when the target is on the spin axis the modulation of the error signal is not dependent upon the energy distribution pattern of the beam.

In both of the phase-sensitive rectifier circuits of elevation commutator 425 and azimuth commutator 426, the reference voltage should be large compared to the error signal voltage produced by a target displaced from the spin axis in order to use the linear portion of the current-voltage curve of the rectifier tubes, so as to give a fairly accurate approximation of the position of the target. Also, in some instances, it may be found necessary to provide selective filters in the outputs of reference voltage generator 175, so as to eliminate harmonics of the reference voltage frequency which would interfere with the accurate operation of the phase sensitive circuits.

Wings 31 on the wing indication of Fig. 3 are created by wing generator 515 shown on the block diagram of Fig. 10 and shown in detail in Fig. 14. It comprises a pair of pentode tubes 516 and 517 connected together as to form an electron coupled flip-flop circuit. Electron coupling is preferred to prevent voltage variations on the plates of the tube from affecting the operation of the circuit. The plates of tubes 516 and 517 are connected respectively through resistances 518 and 519 to point 520 which is by-passed to ground through a condenser 521 and connected to a source of positive potential, indicated at 522, through a variable resistance 523. The suppressor grids of tubes 516 and 517 are connected to ground, and the cathodes are connected together and through a resistance 524 to ground. This resistance is shunted by a switch 525 which, in the position shown, places the resistance in the cathode circuit, thus biasing tubes 516 and 517 so as to render them inoperative, but when the switch is closed so as to short-circuit resistance 524, the cathodes are connected to ground and the circuit will operate as will be explained.

The screen grids of tubes 516 and 517 act as plates and are connected together through a resistance 526 the midpoint of which is by-passed to ground by condenser 526a and is connected through another resistance 527 to a source of positive potential, indicated at 528. The screen grid of tube 516 is also connected to the control grid of tube 517 through condenser 529 shunted by resistance 530. Similarly the screen grid of tube 517 is connected to the control grid of tube 516 through condenser 531 shunted by resistance 532. The control grids of tubes 516 and 517 are biased by connecting them through resistances 533 and 534, respectively, to a point on a voltage divider network connected between ground and a source of negative potential, indicated at 535. Resistances 533 and 534 are shunted by condensers 536 and 537, respectively.

A trigger pulse from pulser 226 is delivered to the grids of tubes 516 and 517 by wire 538 which is connected to the junction of condensers 536 and 537 and applies the trigger pulse to control grids of both tubes 516 and 517. The values of the component parts of this circuit are so chosen that the circuit has two conditions of operation. Either tube 516 is full on and the tube 517 is shut off, or tube 517 is full on the tube 516 is shut off. The trigger pulse may be either positive or negative, but should coincide with the time of the electromagnetic pulse, as does the pulse delivered to primary gate circuit 276 of Fig. 12. If the trigger pulse is negative, it will cause whichever tube that is full on to cut off, thereby causing the other one to conduct, and the circuit will remain in that condition until another negative pulse is received, whereupon the second tube will shut off and the other will conduct. If the trigger pulse is positive, the tube that is off will be turned on by the pulse, and the trigger pulse will thus cause the circuit to assume its other condition of operation. Thus, a square wave will appear on the plate of each of tubes 516 and 517 having the frequency of half the repetition frequency of the trigger pulse but these waves will be opposite in phase. Since the trigger pulse occurs each time the electromagnetic pulse is radiated, the frequency of the square wave produced by wing circuit 515 is half the frequency of the electromagnetic pulse. These square waves of opposite sign have been illustrated at 513 and 514. Every time a pulse of electromagnetic energy is radiated, therefore, circuit 515 will change one of its conditions of operation to the other.

The plate of tube 516 is connected through coupling condenser 540 to wire 541 which leads to a resistance-capacity peaking circuit which is shown in Fig. 12 just at the left of cathode ray tube 1 and comprises small capacity condenser 542 to which wire 541 is connected, and resistance 543 which connects the other side of the condenser to ground. The junction of condenser 542 and resistance 543 is connected through a coupling condenser 544 to right horizontal deflecting plate 240 of cathode ray tube 1.

The plate of tube 517 is also provided with a peaking circuit, but switch 408, already described in connection with circuit 338 for producing the horizontal component for the semaphore, is included in the circuit, alternatively to connect the plate of tube 517 to left horizontal deflecting plate 239 through small condenser 409 and coupling condenser 409a, or to connect circuit for 338 for producing the horizontal component of the semaphore to the same deflecting plate. Thus, the plate of tube 517 is connected through coupling condenser 545 to wire 546 which leads to contact 547 (Fig. 12) of switch 408, the arm of which is connected to condenser 409, which is part of the peaking circuit, resistance 550 being connected between the other side of the condenser and ground. The junction of resistance 550 and condenser 409 is connected through coupling condenser 409a to left horizontal plate 239 of cathode ray tube 1.

The effect of these peaking circuits, comprising the condenser-resistance combination 542—543 and 409—550, is to produce from the square wave output of tubes 516 and 517 alternately positive and negative sharply peaked pulses which decay exponentially, these pulses appearing somewhat as indicated at 548 and 549 (Fig. 14). It will be seen that these peaked pulses are delivered to horizontal deflecting plates 239 and 240 in push-pull. When a positive pulse appears on horizontal deflecting plate 239, a negative pulse appears on horizontal deflecting plate 240, thus causing the electron beam to sweep towards the left. When a positive pulse appears on plate 240, a negative pulse will appear on plate 239, thus causing the electron beam to sweep to the right. Since positive and negative pulses are applied alternately to each horizontal deflecting plate, the electron beam will sweep first to one side and then to the other for successive electromagnetic pulses. The magnitude of these sidewise sweeps will be determined by the magnitude of the peaked pulses affecting the deflecting plate, and after being swept to one side or the other the beam will drift back, following the exponential decay of the pulse, to its normal position, as determined by elevation commutator 425 and azimuth commutator 426, before the next pulse of electromagnetic radiation is transmitted. The time required for the beam to drift back to its normal position will be determined by the constants of the peaking circuits of tubes 516 and 517.

As will appear later, the intensity of the electron beam is not sufficient to produce light on the face of cathode ray tube 1 except when the control grid of the cathode ray tube is given a positive pulse by video driver 340, which is in turn controlled by the response of the receiver. Therefore, during the sidewise excursion of the beam, no light appears on the tube until the reflected radiation is received. The electron beam will deflect, for instance, towards the right upon the transmission of an electromagnetic pulse and will then start to drift back towards its normal position, as determined by the position of the target with respect to the spin axis of the circular scan. The rate of drift back to the normal position will follow the exponential curve of peak pulses 548 and 549. When the reflected radiation is received, the response of the receiver operates video driver 340 and the potential of the control grid of the cathode ray tube is swung in the positive direction to intensify the electron beam and cause it to produce a trace of light on the face of the cathode ray tube, as it drifts towards its normal position. When this happens, the beam will be a distance from that normal position which is approximately inversely proportional to the range of the object, since it will always take the same time for the beam to move out and drift back to a predetermined position.

Since the rate of movement of the beam in drifting back to its normal position follows an exponential curve, it will be seen that the beam will move a great deal farther for small changes of range when the signal is received at the early part of the drift back than where the signal is received towards the end of the drift back, and at the early part of the drift back the movement is nearly linear with time. Thus, the indication of range by the length of the wing spread becomes more accurate with short ranges where the signal is received a short time after the electromagnetic pulse is radiated. The range of a distant target will not be very accurate, since the wing spread will not vary linearly with range when the target is far away. Good approximate estimates of range, however, may be made, even though the range scale is thus crowded into a small space adjacent the spot. But as the distance between the target and the source of radiation becomes less and less the accuracy of the range increases. This is important because in tracking down an airplane, for instance, it is highly desirable for the pilot to know the range accurately as he closes in on the target airplane.

In order that the light will continue on the cathode ray tube for the entire period of time required for the electron beam to move from its position when the reflected radiation is received to its normal position, as determined by the position of the target, the time constant of the cathode circuit of video driver 340 is changed when switch 354 is changed from its semaphore indicating position to its wing indicating position. In the semaphore indicating position resistances 357 and 347 are in parallel, while in the wing indication position of the switch, resistance 357 is eliminated and resistance 347 carries all of the plate-cathode current of the tube. This resistance is much larger than resistance 357, and the values are such as to change the time constant when switch 354 is reversed from the position shown to engage contact 356, the result being that the leading edge of the signal pulse throws the control grid positive which causes the potential of the cathode to rise, and this new cathode potential is maintained after the end of the signal pulse by the charge on coupling condenser 348, falling away slowly as the condenser discharges more slowly through resistance 347. Thus, the intensity of the electron beam will gradually diminish, as it moves from the point where the signal is received to its normal position.

Since the movement of the electron beam in the case of the wing indication is much less than its movement for producing the semaphore indication, and it even stays in one position for a large portion of the time, the intensity of the beam should be much less in order to render the traces invisible except when the wings are produced. It will be remembered that switch 212 in primary gate circuit 276 (Fig. 12), when in the position shown, places a negative pulse on the cathode of the cathode ray tube which increases the intensity of the electron beam during the time period of the pulse which corresponds to the range of the apparatus. When the switch is thrown to the other position, however, for the wing indication, the negative potential on the cathode of the cathode ray tube is removed which prevents the electron beam which is now relatively free from movement from producing too much, if any, light. Condenser 223 connected to the grid of tube 279 is very small in capacity and the leading edge of the positive pulse which will appear on that grid will produce a positive pip of voltage on cathode 234 of cathode ray tube 1 which will momentarily prevent the electron beam from producing light, but this is unimportant, since it occurs at the beginning of the excursion of the electron beam from its normal position. At the end of the primary gate, however, the trailing edge of the positive pulse on the grid of tube 279 will produce a negative voltage pip on cathode 234 of the cathode ray tube. This will occur at the time when the electron beam has completed its excursion either to the right or left and is back at its normal position again, and the negative pulse on the cathode will drive the cathode sufficiently negative with respect to the control grid to cause the electron beam to produce a bright spot on the face of the tube. This bright spot, coming at the end of each primary gate, insures the visibility of the spot of light on the tube, in the target position and, because of the persistency of the fluorescent screen, the illumination of the spot will appear constant.

In the case of the semaphore indication with the spiral scan any number of objects may appear in the field of scan and be represented on the indicating tube. The number of the objects will not affect the accuracy of the indication, except as objects very close together may produce semaphore lines which are hard to distinguish and identify. In the case of the wing indication and circular scan, however, the accuracy of the indication may depend on the presence of a single object or target within the field of scan. It has been shown that a reflected signal at the pulse frequency will be modulated at the frequency of spin by the presence of a target displaced from the spin axis, and that the phase of this spin frequency modulation and the amplitude of the modulation within certain predetermined limits of target displacement from the spin axis will determine the position of the electron beam in the indicating tube. However, if there is more than one target within the field of scan, more than one spin frequency voltage wave will be produced, and if reflected signals from these targets are allowed to affect the apparatus, the electron beam will try to move to some position produced by the average effect of these error signal voltage waves. Such a position may represent the center of gravity of the two or more objects within the field of scan, and the representation produced in this manner will obviously be of little use in tracking down or in aiming guns at any particular target. In using the apparatus, therefore, the operator should be sure when switching from the semaphore indication and spiral scan to the wing indication and circular scan that one target and only one appears at the center of the field, unless the arrangement to be later described is utilized.

*Receiver gate action*

It has previously been explained that switch 236 effectively disconnects receiver 235 from antenna system 35—36—37 when an electromagnetic pulse is being radiated. However, there is considerable power involved in the radiation of this pulse and therefore some of the energy may leak into the receiver, and, since this leakage may be many times stronger than the echo signal normally received, it may tend to block the receiver, so that the echo signals received for some time later will not produce the desired response. In order to prevent this effect, receiver gate circuit 277 (Figs. 10 and 12), is provided for sensitizing the receiver during a period of time corresponding to the range of the apparatus and excluding the period of time occupied by the radiated electromagnetic pulse. As far as the spiral scan and semaphore indication is concerned there would be no other reason for blanking out the receiver during the time of radiated pulse. If the receiver were permitted to respond to this radiated pulse and in some manner were prevented from blocking, it would merely act to intensify the electron beam in the cathode ray tube at the start of its upward vertical sweep, and the effect would be to brighten line 24 along the lower edge of the face of the tube, as shown in Fig. 2. When it comes to the circular scan and wing indication, however, a strong signal at the time of the radiated pulse will interfere with the range indication on the face of the tube. It would not interfere with the location of the electron beam, since the response of the receiver produced by it would be a constant amplitude wave at the pulse frequency and this frequency would be filtered out in detector circuit 362 of Fig. 15, so that there would be no effect on the deflecting plates of the cathode ray tube. But, since the response of the receiver acts on video driver 340 to intensify the electron beam of the cathode ray tube when the signal is received, it would also intensify it when the electromagnetic pulse was radiated if the receiver were sensitized at this time. Thus, the electron beam would be sensitized at the start of its sidewise excursion to produce wings 31 of Fig. 3, and, because of the time constant of the cathode circuit of video driver 340, the light trace would appear for the entire duration of this sidewise sweep, and the received signal, coming in later, would have little or no effect on the electron beam. Receiver gate 277 is therefore desirable in the present instance to insure the indication of range by the length of wings 31 in the wing indication.

Receiver gate circuit 277 is preferably arranged so that it may sensitize the receiver circuit for a certain time when the spiral scan and semaphore indication is used and for a different time when the circular scan and wing indication is used. This time of sensitizing the receiver will depend on the predetermined desired range of the system. For the spiral scan and semaphore indication to be used for searching, the range may be in the neighborhood of five or ten miles, while for the circular scan and wing indication used for tracking and aiming, it may be somewhere under one mile.

In Fig. 12 at the upper right hand corner, circuit 277 for producing this receiver sensitizing gate pulse is disclosed. The circuit comprises two tubes 554 and 555 which are coupled together as a flip-flop circuit with the screen grid of tube 554 acting as the plate and connected directly through resistance 556 which is shunted by condenser 557 to the control grid of tube 555. The screen grid of tube 554 is also connected through resistance 558 to the junction of resistances 559 and 560 connected in series between the plate of tube 554 and a source of positive potential, indicated at 561. The junction of resistances 559 and 560 is by-passed to ground through a condenser 562. The grid of tube 555 is connected through grid resistance 563 to the arm of potentiometer 564 the resistance of which is connected between a source of positive potential indicated at 565, and ground, the arm of the potentiometer being by-passed to ground through condenser 566. The plate of tube 555 is connected through resistances 567 and 568 to a source of positive potential, indicated at 569, the junction of resistances 567 and 568 being by-passed to ground through condenser 570. The cathodes of tubes 554 and 555 are connected together and by-passed to ground through condenser 571, and the cathodes are also connected to the source of positive potential, indicated at 565. The grid of tube 554 is connected to a source of positive potential, indicated at 572 through resistance 573, which is large enough to prevent excessive grid current in tube 554, and this grid is also connected through resistance 574 to contact 575 of switch 576 the arm of which is connected to the cathodes of tubes 554 and 555. The feedback connection from tube 555 to tube 554 is by means of condenser 577 which is connected between the plate of tube 555 and the grid of tube 554. The input of the gate circuit is connected to the grid of tube 555 and the input voltage is obtained from the plate of tube 278 of primary gate circuit 276, the plate of tube 278 being connected to the grid of tube 555 through resistance 578 and coupling condenser 579.

In order to provide an adjustable delay for receiver gate circuit 277, a time constant circuit is provided in the grid circuit of tube 555. The time constant of this circuit is primarily produced by resistance 578, coupling condenser 579, and condenser 557. The components of this circuit are so chosen that the square pulse from the plate of tube 278 will cause the potential of the grid of tube 555 to rise gradually until a potential is reached which will cause grid current to flow, so that the potential on the grid caused by the square pulse will appear as a trapezoidal pulse, somewhat as indicated at 580.

Tube 555 of the receiver sensitivity gate circuit is biased below cut off by the voltage dividing circuit including resistances 560, 558, 556, 563 and a portion of potentiometer resistance 564. The cut-off potential may be adjusted by adjusting the arm of potentiometer 564, and is adjusted so that the sloping leading edge of pulse 580 appearing on the grid of tube 555 will not cause the tube to operate until the desired delay has elapsed to maintain the receiver insensitive until after the transmission of the electromagnetic pulse.

With the proper adjustment of the components of the circuit, tube 554 is normally operating because of the positive potential on its control grid, while tube 555 is normally cut off, a suitable potential below cut-off being maintained on the grid by the bias circuit. When tube 555 is turned on by the action of the sloping leading edge of pulse 580 the plate potential drops. This drop passes through condenser 577, causes the control grid of tube 554 to drop in potential sufficiently to cut it off. The potential rises at the anode load resistors and the increase in screen grid potential thus produced is communicated to the control grid of tube 555 to cause this tube to saturate, whereupon the grid current flattens off the top of pulse 580. Tube 555 will then remain on and tube 554 off (for semaphore indication) until the trailing edge of pulse 580 reduces the potential of the grid of tube 555 to shut off this tube, which raises the potential of the grid of tube 554 and causes that tube to operate again.

This flip-flop action produces square positive pulse 581 on the plate of tube 554 which is transferred through coupling condenser 582 to the grid of cathode follower tube 583 the plate of which is connected to a positive source of potential, indicated at 584, while the grid and cathode are connected respectively through resistances 585 and 586 to ground. The positive square gate pulse appearing on the cathode of tube 583 is delivered by means of wire 587 to receiver 235 (Fig. 10), where it is connected to a suitable modulating grid of one or more of the tubes as, for instance, in the intermediate frequency stages, so as to sensitize the receiver only during the period of the pulse.

Condenser 577 is very small, but with switch 576 in the position shown, its discharge path is through high resistance 573, and the time constant is such as to maintain the grid of tube 554 negative for the duration of pulse 580 and until the trailing edge of that pulse cuts off tube 555 again. The leading edge and the trailing edge of gate pulse 581 are therefore controlled by pulse 580 from primary gate 276, with switch 576 in the position shown.

Switch 576 is thrown into the other position with the switch arm engaging contact 575 when the wing indication is used. With this connection, the bias on the control grid of tube 554 is little affected, because of the positive bias applied through resistance 573, but a new discharge path for condenser 577 is provided through resistance 574 which is low enough to permit condenser 577 to discharge faster, so that the time during which the potential on the plate of tube 555 can hold the grid of tube 554 below cut-off is shortened to agree with the shorter range of the circular scan and wing indication. When the switch is thrown into the wing indication position, receiver gate circuit 277 then becomes self-restoring. Pulse 580 from primary gate circuit 276 will turn it on, but it will shut off itself after the desired time interval and before the termination of pulse 580.

Of course, gate circuit 277 might be arranged to produce a negative pulse, as by connecting the plate of tube 555, instead of the plate of tube 554, to the input of tube 583. This negative pulse could then be applied to one or more of the cathodes of the receiver circuit to produce the same effect as described above. Or, if desired, the receiver may be made normally sensitive, and the negative voltage between pulses used to desensitize it during this period of time.

*Spiral scan operation*

In the operation of the complete apparatus for searching and tracking, let it be assumed that the apparatus is installed in an airplane, the spiral scan and semaphore indication being used for search purposes to locate enemy airplanes, while the circular scan and wing indication is used for tracking down a particular enemy airplane to aid in shooting it down. With the switches all in the positions indicated in the various figures of the drawing, yoke 51 supporting antenna system 35—36—37 is rotating at a constant speed about the spin axis and at the same time reflector 36 is rocking about the tilt axis at a much slower speed. Generator 175 is producing two voltage sine waves 90° displaced in phase and these voltage waves are being modulated by the action of potentiometer 195 as reflector 36 rocks about the tilt axis.

Blocking oscillator 227 delivers trigger pulses to pulser 226 which initiates the formation of high-square pulses to control the operation of high-frequency generator 225. Because of the action of the pulser on the high-frequency generator, pulses of high-frequency oscillations are delivered to antenna system 35—36—37 through wave guide sections 42, 41, 40, 39 and 35, and pulsed electromagnetic energy is radiated from the antenna system in the form of a concentrated beam, as controlled by reflectors 36 and 37. Because of the movement of reflector 36 this beam is caused to scan the field with a spiral movement, as has already been described. By the action of switch 236 there is a substantially open circuit to receiver 235 for the duration of each electromagnetic pulse, but the receiver is effectively connected to the antenna system for the periods between successive pulses.

When one or more objects appear within the field scanned by the electromagnetic beam they will intercept some of the radiation and reflect it back towards the antenna system. It will arrive there some time later, depending on the distance of the object from the antenna system. The reflected radiation acting upon the receiver, when the receiver is sensitized by receiver gate 277, will control the intensity of the electron beam of indicator tube 1 and also the movement of the beam so as to produce the semaphore indication.

Pulser 226 operates primary gate 276 with sufficient delay so as to initiate a square pulse at the instant the electromagnetic pulse is radiated. This square pulse from primary gate 276 controls vertical sweep generator 275 which produces two saw-tooth voltages opposite in phase which are applied through switches 312 and 313 to the lower and upper vertical deflecting plates of the cathode ray tube. The action of the sweep generator causes the electron beam of the cathode ray tube to sweep upwardly from horizontal reference line 24 of Fig. 2 each time a pulse of electromagnetic radiation is transmitted. At the same time the electron beam is moved horizontally at a much slower rate in accordance with the movement of the scanning mechanism under control of the cosine voltage wave produced by generator winding 177 of generator 175. Azimuth amplifier 244 applies this voltage in push-pull to horizontal deflecting plates 239 and 240 of cathode ray tube 1. Since this voltage is modulated by the action of potentiometer 195, the amplitude of the movement of the electron beam about the center of the tube will change, producing the bellows-like action already described.

When the reflected signal is received by receiver 235 it operates video driver 340 to produce a positive potential on control grid 243 of cathode ray tube 1 for the duration of the received pulse which intensifies the electron beam, so as to produce a bright spot which is elongated into a trace by the auxiliary movement of the beam. At the same time the video driver causes circuit 338 for producing the horizontal component of the semaphore to produce a saw-tooth pulse which is applied to left horizontal deflecting plate 239 of cathode ray tube 1 and acts to move the electron beam towards the right an amount determined by the excess of the magnitude of the received signal over the cut-off value of tube 366 of circuit 338.

Also, at the same time, video driver 340 causes circuit 303 for the vertical component of the semaphore to produce two negative saw-tooth pulses which are applied to vertical deflecting plates 241 and 242 of the cathode ray tube. These negative saw-tooth pulses have a magnitude determined by the excess of the magnitude of the received signal over the cut-off value of tubes 364 and 365 of circuit 303 and also by the instantaneous value of the modulated voltage wave from winding 178 of generator 175. These last saw-tooth pulses are delivered in push-pull to plates 241 and 242 of the cathode ray tube and act to cause the electron beam to move either upwardly or downwardly depending upon the difference in magnitude of the two pulses.

Thus, at the instant of the received signal, when the electron beam of the cathode ray tube is in a position determined by the horizontal direction of the electromagnetic beam and the time required for the radiation to leave the antenna system, travel out to the target, and be reflected back to the antenna system again, the received signal causes an auxiliary excursion of the beam at an angle determined by the magnitude of the received signal in a horizontal direction and the magnitude of the received signal together with the elevation of the target in a vertical direction and semaphore line 23 is produced. Since most targets will reflect back several successive pulses of the electromagnetic radiation because of the finite beam width, several semaphore lines will usually appear. The average point of origin of these semaphore lines will then indicate the approximate location of the target airplane within the field of scan, while the angle the lines make with the horizontal will be a measure of the elevation.

All of the airplanes or other objects within the field of scan and also within the range of the apparatus will appear on the screen of the cathode ray tube represented by the angular semaphore lines. The operator will then select one of these targets, usually the nearest one and therefore one represented by lines nearest to base line 24 of Fig. 2, for tracking and shooting down. He will, however, first alter the direction of his airplane until the particular target selected will be directly in front of the airplane and is the only target represented within the field of scan or the only one in the vicinity of the center of that field. The operator can easily tell when he has the airplane pointing substantially at the particular target because the indication on the cathode ray tube will appear on a vertical line through the center of the tube and the semaphore line will be horizontal at this particular moment.

Circular scan operation

Having selected the particular target to track down and having maneuvered the airplane until the target is directly in front of the airplane and is the only target observable in the center of the field, the operator then operates the control which reverses all of the switches utilized for shifting the connections from spiral scan with semaphore indication to circular scan with wing indication. By the opening of double switch 130—131 of Fig. 6 reflector 36 will continue to rock until it reaches the desired 3° position, whereupon it will stop and hunt back and forth under control of cam 170 (Figs. 6 and 7), and switches 136 and 137 until it becomes stationary with respect to the tilt axis at the desired 3° position. The antenna system, however, will continue to rotate about the spin axis and the axis of the pulsed electromagnetic beam will describe a circle, as already described.

Now the target will be located approximately at the center of the circular scan. If it is at the center of the circular scan, the reflected signal will produce no modulation of the received signal at the spin frequency, and video driver 340 and detector 362 will have no effect on elevation commutator 425 and no difference in potential between vertical deflecting plates 241 and 242 of the cathode ray tube will be produced. Hence, there will be no tendency for the electron beam to move vertically and it will remain centered vertically on the face of the tube. Since detector and amplifier 362 also controls azimuth commutator 426, there will be no effect on this circuit, and the azimuth commutator will produce no difference in potential between horizontal deflecting plates 239 and 240 of the cathode ray tube. This will cause the electron beam to center on the face of the tube with respect to the horizontal movement thereof.

If, however, the target is above the spin axis of the circular scan, a sine wave voltage is produced by the signal which has a phase which affects elevation commutator 425 through the medium of detector and amplifier 362 to produce a difference in potential between vertical deflecting plates 241 and 242 of the cathode ray tube, giving the upper plate a positive potential and the lower plate a negative potential, the values being approximately proportional to the elevation of the target above the spin axis of the circular scan. This will move the electron beam to a corresponding position on the face of the cathode ray tube.

If, at the same time, the target is to one side of the spin axis of the circular scan, then the sinusoidal voltage wave produced by the signal will have a phase value which will cause detector and amplifier circuit 362 to affect azimuth commutator 426 so as to produce a difference in potential between horizontal deflecting plates 239 and 240 which will cause the electron beam to move a corresponding distance to one side or the other.

Both the horizontal and vertical displacement of the electron beam in this manner by the modulated sinusoidal voltage of the received signal will be determined in magnitude by the amplitude of the received signal modulation wave, and thus the displacement of the electron beam from the center of the cathode ray tube will be a measure of the displacement of the target from the spin axis of the circular scan.

The electron beam will remain normally at one spot on the face of the cathode ray tube, as determined by the phase of the sinusoidal voltage produced by the signal as compared to the reference sinusoidal voltages produced by windings 177 and 178 of generator 175. However, because the negative potential is no longer applied to the cathode of the cathode ray tube by primary gate circuit 276, by virtue of switch 212 being thrown to its other position, the electron beam will produce no light upon the face of the tube at this time.

As each pulse of electromagnetic radiation is transmitted, pulser 226 delivers a trigger pulse to wing generator 515 which produces alternate positive and negative pulses whose magnitudes are determined by the constants of wing generator circuit 515. These positive and negative pulses are delivered in push-pull to horizontal deflecting plates 239 and 240 of the cathode ray tube. As one electromagnetic pulse is radiated, the potentials on the horizontal deflecting plates are such as to cause the electron beam to make an excursion to the right; as the next electromagnetic pulse is radiated these are such as to cause the electron beam to make an excursion to the left. Thus, successive electromagnetic pulses initiate an excursion of the electron beam first to the right and then to the left.

These excursions of the electron beam to one side or the other occur suddenly by the effect of the push-pull voltage pulses delivered to horizontal deflecting plates 239 and 240 from wing generator 515 and move the beam out to or beyond the side edge of the tube. It then drifts back again towards its normal position with the trailing edge of this pulse, the time of return being determined by the circuit constants. In the course of its return to its normal position the received signal causes video driver 340 to intensify the electron beam by the positive pulse applied to the control grid of cathode ray tube 1 and the trace becomes visible on the face of the tube. Because of the change in time constant in the cathode circuit of video driver 340 when switch 354 is changed to the wing indication position, the positive pulse will remain on control grid 243 of the cathode ray tube longer than the time duration of the reflected signal pulse, falling off gradually as the electron beam approaches its normal position.

At the end of the primary gate, which will occur some time after the electron beam has reached its normal position, a sharp negative pulse from primary gate circuit 276 is delivered through switch 212 to cathode 234 of the cathode ray tube and acts to intensify the electron beam so as to create a bright spot at the normal position of the electron beam.

The next successive electromagnetic pulse will initiate a sudden movement of the electron beam to the other side of its normal position, the magnitude of which movement will be determined by the magnitude of the pulses produced by wing generator 515. Again this movement will be invisible because there will be no signal to raise the potential of the control grid of the cathode ray tube. The electron beam will start to drift back towards its normal position again, following the trailing edge of the controlling pulses of the wing generator, and when the signal is received, the positive pulse on control grid 243 of the cathode ray tube will intensify the beam sufficiently to cause its trace to produce a bright line as before. Again this bright line will fade as the electron beam approaches its normal position as the charge on the control grid leaks off following the trailing edge of the signal pulse. And again after the electron beam has reached its normal position the sharp negative pulse caused by the end of the primary gate is delivered to cathode 234 of the cathode ray tube, so as to intensify the beam and brighten the spot between the wings.

When the target is far away, towards the limit of the range of the apparatus, it will take considerable time for the reflected signal to be received and to intensify the electron beam by putting the positive potential on the control grid of the cathode ray tube. Hence, the electron beam may return almost to the normal position before the beam is intensified to produce the light trace on the tube. Therefore, the wings will appear very short. As the airplane approaches the target airplane, this time becomes less and less and therefore the wings become longer and longer. The pilot of the airplane will fly towards the target airplane, keeping the central spot of the wing indication exactly at the center of the tube. He will then know that he is pointed directly at the target airplane. As he comes nearer and nearer to the target airplane, the wings at the sides of the spot will grow longer and longer, and when they have reached a predetermined length, which will correspond to a predetermined distance from the target airplane, the guns of the airplane, which have been pointed in the same direction as the spin axis of the circular scan, may then be fired so as to hit and bring down the target airplane.

The system provides an approximately accurate presentation of the various airplanes or other objects coming within a wide field of scan with a good approximation of their azimuthal locations, ranges, and elevation angles, so that the operator may tell how many enemy airplanes are within five or ten miles of him and their approximate location. By means of a single switch control he may then switch to a more accurate indication of one particular object or airplane which will appear on the same indication device, and he may point his airplane and his guns accurately at that particular airplane, so that he may follow it and shoot it down when he comes within the desired range. The switching mechanism is entirely automatic, changing from one scanning procedure to the other and from one indication method to the other without delay and without loss of the signal response from the target. Although the apparatus may have other uses, it is particularly useful in air combat for apprising the pilot of the enemy airplanes in his vicinity and aiding him in accurately tracking down a particular enemy airplane and shooting it down.

*Ground reflection blanking for spiral scan*

When used in an airplane for purposes of search with the spiral scan and semaphore indication, some error may be produced by close range ground or sea reflections when the electromagnetic beam is pointing down considerably below the central axis of the spiral scan. In order to eliminate this error low elevation blanker 590 (Figs. 10 and 13), may be used. The circuit for this is shown in detail in Fig. 13 to the left of the figure and comprises tube 591, which may be a three element tube, and pentode tube 592. Tube 591 may have its plate connected to a source of positive potential, as indicated at 593, while its cathode may be connected through resistance 594 to the arm of potentiometer 595 the resistance of which is connected between the negative source of potential 413 for the cathodes of tubes 411 and 412 and ground. Grid resistance 596 may also be connected between the control grid and the arm of potentiometer 595.

The modulated sinusoidal voltage wave which corresponds to the vertical movement of the electromagnetic beam in producing the spiral scan is delivered to the grid of tube 591 from the plate of tube 411 of elevation phase splitter circuit 410 through coupling condenser 597. The cathode of tube 591 is connected through resistance 598 to the control grid of pentode tube 592. The cathode of this pentode tube is grounded, as is also the suppressor grid. The screen grid of tube 592 is connected through resistance 599 to switch 600 having contacts 601 and 602, the former being connected to a source of positive potential, indicated at 603, and the latter being grounded. The plate of tube 592 is connected by wire 604 directly to the plate of the tube in receiver gate circuit 277 (upper part of Fig. 12).

The bias of tube 591 is adjusted by means of potentiometer 595 so that the tube will cut off at all times except for a predetermined positive portion of the voltage wave applied to its grid. The positive portion of this voltage wave corresponds to the negative or lower position of the electromagnetic beam during its spiral scan, and hence tube 591 may be made to operate during a predetermined portion of this lowermost half of the spiral scan by adjusting potentiometer 595.

Whenever tube 591 is drawing plate current, the potential of the control grid of pentode tube 592 will be raised and this pentode tube will conduct, drawing a large amount of current from the plate supply for tube 555 in receiver gate circuit 277 of Fig. 12. This lowers the potential on the plate of tube 555 sufficiently to prevent the operation of the receiver gate circuit. During the spiral scan of the electromagnetic beam, therefore, when the beam reaches a predetermined point in its downward movement, and for the remainder of the time it is below the horizontal level corresponding to this predetermined point, in producing one turn of the spiral, tube 591 will conduct, thus causing pentode tube 592 to conduct and lowering the potential on the plate of tube 555 in the receiver gate circuit sufficiently to prevent the operation of the receiver gate, so that the receiver does not become sensitized.

As the electromagnetic beam continues to trace the particular turn of the spiral and again reaches a predetermined direction on the upward turn, the voltage on the plate of tube 411 in elevation phase splitter circuit 410 will be such as to cut off tube 591 which, in turn, cuts off tube 592 and permits the voltage on the plate of tube 555 in receiver gate circuit 277 to rise sufficiently, so that the receiver is sensitized by the gate for a predetermined time following the transmission of the pulse of electromagnetic radiation. By adjusting potentiometer 595, any desired amount of the vertical deflection of the electromagnetic beam below the spin axis of the spiral scan may be prevented from affecting the indicator tube, so that only those targets situated in the upper portion of the scanned field will produce an indication on the face of the tube.

Low elevation blanker 590 is not used with circular scan, since it would interfere with the accurate operation and because the electromagnetic beam is concentrated in a much smaller region. This is controlled by switch 600 (Fig. 13), may be operated independently of the other switches, and which, as will be evident, removes the positive potential from the screen grid of pentode tube 592 and connects the screen grid to ground and thus prevents the operation of the tube.

*Blanking additional distant targets in circular scan*

As has already been explained, in order to obtain accurate representation of the target on the face of the tube for circular scan and wing indication, unless certain provisions are made, there must be a single target within the field of scan. By means of a simple connection receiver gate 277 may be made to de-sensitize the receiver when a signal is received from the nearest target, so that even if there is more than one target within the field of scan, accurate representation of the nearest target may be obtained. During circular scan, receiver gate 277 is self-restoring and acts to de-sensitize the receiver before the primary gate pulse has been completed and after a time depending on the time constant of condenser 577 and resistance 574. If a positive pulse from the first signal received is delivered to the grid of tube 554, receiver gate circuit 277 may be made to operate so as to de-sensitize the receiver before this normal time period has elapsed.

To accomplish this purpose wire 605 (bottom of Fig. 12), may connect terminal 356 on switch 354 of video driver circuit 340 with switch 606 (top of Fig. 12), in receiver gate circuit 277, the terminal of the switch being connected through coupling condenser 607 to the grid of tube 554. In some instances it may be necessary to amplify the signals thus delivered to the grid, and this will be done by means of a suitable amplifier tube or tubes included in the circuit of wire 605.

If spiral scan and semaphore indication discloses several targets within the field of scan, the operator will point his airplane at the nearest target, and with switch 606 in the position shown, will switch to circular scan and wing indication. When the signal from the nearest target is received, a positive pulse will be delivered from the cathode of video driver 340 by wire 605 and switch 606 and coupling condenser 607 to the grid of tube 554 in receiver gate circuit 277. This will turn on tube 554 which will apply a negative potential to the grid of tube 583 and terminate the positive pulse which is being applied to receiver 235 from the cathode of tube 583. Receiver gate circuit 277 will then remain in this condition until the radiation of the next electromagnetic pulse which will start primary gate circuit 276 to produce pulse 580, the sloping leading edge of which will initiate the operation of receiver gate circuit 277.

The receiver will thus be de-sensitized during the period of time between the first signal which is received and the time just following the radiation of the next succeeding electromagnetic pulse. Since the receiver is only on long enough to receive the first signal after the electromagnetic pulse is radiated, this signal will be the only one which will produce an error signal for comparison with the reference elevation voltage and the reference azimuth voltage. Therefore, the electron beam in the indicator tube will be accurately positioned to represent the nearest target.

As described in connection with Fig. 9, the angle between the axis of the beam and the spin axis is preferably made equal to one-half the angle between the axis of the main lobe of the beam and the center of the principal side lobe. This provides a relatively wide angle scan with the central cross-over point of the radiation pattern much nearer the source of the radiation than in circular scanning systems heretofore used and with less ambiguity of the received signal. If the path traced by the side lobe overlaps the outer edge of the path traced by the main lobe, a target intercepting the side lobe and not the main lobe will produce a signal which might appear to represent a target within the region of the main lobe. By causing the main lobe to trace a path which encompasses the region occupied by the portion of the side lobe nearest the spin axis when the main lobe was in its diametrically opposite position, the main lobe will also produce a signal from that particular target which will be greater than the signal from the side lobe and the difference between the two will give a fairly accurate indication of the position of the target. Therefore, by adjusting the angle of the axis of the main lobe of the beam with respect to the spin axis in the manner indicated, the angle of scan can be increased and ambiguity of the signals from targets at the sides of the field may be reduced.

The invention is subject to considerable variation. In the first place, although an arrangement for scanning with a directional antenna system is disclosed and that antenna system is used both for radiating and receiving energy, it is possible to radiate with the moving directional antenna system and receive with a non-directional antenna system, or, conversely, to radiate with a non-directional antenna system and receive with the moving directional antenna system. Also, although the spiral scanning process and circular scanning process may be preferred for the particular uses explained, other scanning systems may be used. For instance, instead of the spiral scan which has been disclosed for search purposes, a helical scan might be used, in which case the axis of the antenna system might be caused to sweep continuously through 360° about a substantially vertical axis at the same time varying in elevation angle. Or a television scan might be used, the axis of the system sweeping the field in a series of horizontal or vertical parallel lines, the beam starting across the first line again when the last line has been completed. Any type of scanning might be used with the semaphore indication. Also either of the scanning systems might be used alone with a suitable type of indication.

The arrangement for producing the movement of the antenna system, as disclosed, is principally electrical, there being a separate driving motor for tilting the reflector. However, a single driving motor might be used for the entire mechanism and the tilt motion accomplished by suitable mechanical connections, a clutch being provided to stop the tilt motion at the proper time.

The use of double potentiometer 195, geared to the tilt motion of reflector 36 represents a convenient manner of modulating the two voltage sine waves produced by generator 175 for controlling the indicating device. These modulated voltages, however, might be produced in other ways, as, for instance, my using a two-phase generator with a separately excited field and modulating the excitation voltage by the use of a single potentiometer geared to reflector 36.

While it may be preferred in the semaphore indication to utilize the azimuth component of the antenna axis to control the displacement of the electron beam in the cathode ray tube perpendicular to the high speed sweep thereof and to utilize the elevation component to control the angle of the semaphore, these may be interposed, the elevation component of the antenna axis being used to control the displacement of the electron beam perpendicular to the high speed sweep and the azimuth component being used to control the angle of the semaphore. In such a case the face of the tube might be rotated through 90° from the position of Fig. 2 so that the vertical displacement would represent the elevation angle.

As far as the circuits are concerned, it will be evident that many variations may be made to produce the desired results. The oscillators and flip-flop circuits may be of any desired type and the tubes used throughout the circuit may be varied, as desired. The invention, therefore, is not to be limited to the specific details of what has been shown and described except as it is limited by the appended claims.

What we desire to claim and secure by Letters Patent is:

1. In a radio communication system, means for radiating energy pulses at a pulse repetition frequency, means for receiving reflected echoes from targets during the interval between successive pulses, an oscilloscope having a cathode ray tube for presenting said received echoes for target presentation, said oscilloscope including means for presenting a target echo as a visible linear trace on the screen of said tube, means including horizontal and vertical cathode ray deflection circuits connected to said tube for locating the initial point of an echo trace at a spot on the screen to define two out of three spatial coordinates of a target solely by the coordinates of said spot and means for inclining said linear trace with respect to a predetermined base line on said screen in accordance with the third coordinate of said target.

2. In a communication system, a radio transmitting and receiving system for radiating pulses of energy in space and receiving target echoes during the time between successive pulses, said system including a cathode ray tube having a fluorescent screen for giving target indications, means for presenting a target indication as a linear trace on said screen, means including horizontal and vertical cathode ray deflection circuits connected to said tube for locating the initial point of said trace at a spot on said screen to define range and one of two remaining angular coordinates for defining a target in space solely by the rectangular coordinates of said spot and means for inclining said trace with respect to a fixed reference axis on said screen so that the angle of inclination is substantially equal to the remaining angular coordinate of the target.

3. The system of claim 2 wherein the initial point of said trace defines the range and azimuth of a target and wherein the angle of said trace with respect to said axis substantially equals the relative elevation with respect to the communication system.

4. In a radio communication system, an antenna system having a directional characteristic generally symmetrical about an axis of propagation, means for moving said axis of propagation to define a spiral scan about a neutral axis, said communication system including a transmitter for generating energy pulses and a receiver, including a cathode ray tube, for receiving target echoes, means for generating two potentials whose instantaneous values and polarities correspond substantially to the instantaneous elevation and azimuth of said propagation axis with reference to said neutral axis, means for initiating a cathode ray beam sweep along a range axis simultaneously with an energy pulse from the transmitter, means for applying one of said generated potentials to deflect the electron beam along the remaining screen axis, means for generating a linear trace on said screen only in response to target echoes for target indication, the beginning of said trace occurring at a spot on said screen whose coordinates correspond to the range and one of the angular coordinates of the target, means for arresting the sweep of said beam along the range axis upon receipt of a target echo and means for applying the other generated potential to said cathode ray tube to deflect the beam thereof to form a linear trace inclined to the range axis with the angle of inclination indicating the other target angular coordinate.

5. In a radio communication system, an antenna system having a directional characteristic generally symmetrical about an axis of propagation, means for moving said axis of propagation so that said axis defines a circular scan about a neutral axis, said system including a transmitter for generating energy pulses at a fixed rate and a receiver including a cathode ray tube for receiving target echoes, means for presenting a target echo on said tube screen at a point thereof substantially to indicate the azimuth and elevation of said target with reference to said neutral axis solely by the coordinates of said point, means for alternately deflecting the electron beam of said cathode ray tube from said target indicating spot on each side thereof after each transmitted pulse, and means for controlling the intensity of said beam so that a trace is generated between successive pulses only for a time interval after the receipt of a target echo.

6. The system of claim 5 wherein means are provided for periodically desensitizing the receiver after the receipt of a target echo so that the nearest target within the field of scan is presented to the exclusion of other more distant targets.

7. In a radio communication system, an antenna system having a directional characteristic generally symmetrical about an axis of propagation in planes normal thereto, means for moving said axis of propagation to define a circular scan about a neutral axis, said system including a transmitter for generating energy pulses at a fixed rate and a receiver including a cathode ray beam tube for receiving target echoes, means for generating two potentials whose instantaneous values and polarities are functions of the instantaneous azimuth and elevation, respectively, of the propagation axis with respect to said neutral axis, means for deriving an error potential from a target echo with said error potential varying with the instantaneous eccentricity of said target from the neutral axis, means for comparing said error potential with said two potentials to derive two cathode ray beam deflecting potentials representing said instantaneous azimuth and elevation respectively, means impressing both said potentials on said cathode ray tube for locating the cathode ray beam on the tube screen at a point whose rectangular coordinates indicate the azimuth and elevation of said target with reference to said neutral axis, and means for limiting the response of said receiver to the nearest target within the field of scan.

8. The system of claim 7 wherein means are provided for deflecting the cathode ray beam in a direction parallel to one of the rectangular coordinates of the screen alternately after each transmitted pulse, said beam returning to the spot for indicating a target echo and means for suppressing the beam during part of its journey so that the visible trace has a length inversely proportional to the range of said target.

9. In a radio communication system, an antenna system having a directional characteristic generally symmetrical about an axis of propagation, means for moving said axis of propagation to define a spiral scan about a neutral axis, said system including a transmitter for generating energy pulses at a fixed rate and a receiver including a cathode ray tube for receiving target echoes, means for presenting a target echo as a linear trace on said tube screen, said means locating the beginning of said trace at a point on said screen whose rectangular coordinates indicate range and azimuth, means for inclining said trace to the range axis at an angle to indicate elevation, means for altering the movement of said propagation axis from describing a spiral scan to cause the same to describe a circular scan symmetrical with respect to said neutral axis with the scan field being substantially smaller than the field of spiral scan, means for changing the target presentation on said tube screen, said last-named means including means for locating a target echo at a spot on said screen whose coordinates indicate azimuth and elevation, said means also including means for elongating the trace of said target echo so that a substantially straight trace is produced with the length of the trace being substantially inversely proportional to the target range.

10. The system of claim 9 wherein means are provided for preventing target echoes from being presented on said cathode ray tube screen during the time said antenna system scans a predetermined bottom segment of the spiral scan field to thereby eliminate ground echoes.

11. A system of target indication for use in a radar system comprising means for pointing the axis of propagation of a beam of radiant energy in a certain direction, moving said axis of propagation at a given scanning speed to describe a curve symmetrically with respect to said certain direction, means for sending out radiant energy pulses in said beam at a rate rapid with respect to the scanning speed, receiving target echoes after each radiated pulse, means for deriving target position data from said received target echoes, and means for causing said target echo data to produce an elongated luminous trace with the initial point of the trace indicating range and azimuth and with the angle of inclination of said trace with respect to a predetermined base line indicating elevation.

12. In a radio communication system, means for radiating energy pulses at a pulse repetition frequency, means for receiving reflected echoes from targets during the interval between successive pulses, a cathode ray tube for presenting said received echoes for target presentation, means for presenting a target echo as a linear indication, means for locating the initial point of an echo indication at a spot on the screen to define two out of three spatial coordinates of a target solely by the coordinates of said spot, and means for inclining said linear indication with respect to a predetermined base line in accordance with the third coordinate of said target.

13. In a radio communication system, an antenna system having a directional characteristic generally symmetrical about an axis of propagation, means for moving said axis of propagation to define a spiral scan about a neutral axis, said system including a transmitter for generating energy pulses at a fixed rate and a receiver including a cathode ray tube for receiving target echoes, means for presenting a target echo as a luminous trace on said tube screen, said means locating said trace at a point on said screen whose coordinates indicate range and azimuth, means for altering the movement of said propagation axis from describing a spiral scan to cause the same to describe a circular scan symmetrical with respect to said neutral axis with the scan field being substantially smaller than the field of spiral scan.

14. In a radio communication system, an antenna system having a directional characteristic generally symmetrical about an axis of propagation, means for moving said axis of propagation to define a spiral scan about a neutral axis, said system including a transmitter for generating energy pulses at a fixed rate and a receiver including a cathode ray tube for receiving target echoes, means for altering the movement of said propagation axis from describing a spiral scan to cause the same to describe a circular scan symmetrical with respect to said neutral axis with the scan field being substantially smaller than the field of spiral scan, means for locating a target echo at a spot on said cathode ray tube screen whose coordinates indicate azimuth and elevation, said means also including means for elongating the trace of said target echo so that a substantially straight trace is produced with the length of the trace being substantially inversely proportional to the target range.

15. In a radio communication system, an antenna system having a directional characteristic generally symmetrical about an axis of propagation, means for moving said axis of propagation to define a spiral scan about a neutral axis, said system including a transmitter for generating energy pulses at a fixed rate and a receiver including a cathode ray tube for receiving target echoes, means for presenting a target echo as a linear trace on said tube screen, said means locating the beginning of said trace at a point on said screen whose rectangular coordinates indicate range and azimuth, means for inclining said trace to the range axis at an angle to indicate elevation, means for altering the movement of said propagation axis from describing a spiral scan to cause the same to describe a circular scan symmetrical with respect to said neutral axis with the scan field being substantially smaller than the field of spiral scan.

16. In a radio communication system, an antenna system having a directional characteristic generally symmetrical about an axis of propagation, means for moving said axis of propagation to define a spiral scan about a neutral axis, said system including a transmitter for generating energy pulses at a fixed rate and a receiver including a cathode ray tube for receiving target echoes, means for presenting a target echo as a linear trace on said tube screen, said means locating the beginning of said trace at a point on said screen whose rectangular coordinates indicate range and azimuth, means for inclining said trace to the range axis at an angle to indicate elevation, means for changing the target presentation on said tube screen, said last-named means including means for locating a target echo at a spot on said screen whose coordinates indicate azimuth and elevation, said means also including means for elongating the trace of said target echo so that a substantially straight trace is produced with the length of the trace being substantially inversely proportional to the target range.

17. In a radio communication system, an antenna system having a directional characteristic generally symmetrical about an axis of propagation, means for moving said axis of propagation to define a circular scan about a neutral axis, said system including a transmitter for generating energy pulses at a fixed rate and a receiver including a cathode ray tube for receiving target echoes, means for presenting a target echo as a linear trace on said tube screen, said means locating the beginning of said trace at a point on said screen whose rectangular coordinates indicate range and azimuth, means for inclining said trace to the range axis at an angle to indicate elevation, means for changing the target presentation on said tube screen, said last-named means including means for locating a target echo at a spot on said screen whose coordinates indicate azimuth and elevation, said means also including means for elongating the trace of said target echo so that a substantially straight trace is produced with the length of the trace being substantially inversely proportional to the target range.

18. In a radio communication system, a transmitter for generating energy pulses at a fixed rate and a receiver including a cathode ray tube for receiving target echoes, means for presenting a target echo as a linear trace on said tube screen, said means locating the initial point of said trace at a point on said screen which indicates range and azimuth solely by the rectangular coordinates of said point, means for inclining said trace to the range axis at an angle substantially equal to the angle of elevation, means for changing the target presentation on said tube screen, said last-named means including means for locating a target echo at a spot on said screen whose coordinates indicate azimuth and elevation, said means also including means for elongating the trace of said target echo so that a substantially straight trace is produced with the length of the trace being substantially inversely proportional to the target range.

19. In a pulse echo detection system, a cathode ray tube having a fluorescent screen, means for presenting a target echo on said screen at a point thereof which defines the azimuth and elevation of said target solely by the coordinates of said point, means for producing a gradually decreasing deflection of the cathode ray of said tube from said target indicating spot on either side thereof once during each interval between successive transmitted pulses of said pulse echo detection system, and means for increasing the intensity of said cathode ray in response to a target echo so that a visible trace is generated on said screen between successive pulses only for a time interval after the receipt of a target echo.

20. In a pulse echo target locating system, a cathode ray tube having a flourescent screen, means for presenting a target echo on said screen at a point thereof substantially to indicate the azimuth and elevation of said target, means for generating in synchronism with each transmitted pulse a voltage which continuously decreases till the next transmitted pulse occurs, means responsive to said voltage for alternately deflecting the cathode ray of said tube from said target indicating spot on each side thereof after each transmitted pulse, and means for increasing the intensity of said cathode ray so that a visible trace is generated between successive pulses only for a time interval after the receipt of a target echo, whereby the length of said visible trace varies inversely as the range of the target.

21. In a radio pulse echo locating system, means for receiving echo pulses from a target, a cathode ray tube having a fluorescent screen for displaying thereon a projection of the space searched by said system, means for producing on the screen a spot representing the position of the target in said space searched, means for deflecting the cathode ray of said tube on either side of said spot a fixed distance along one rectangular coordinate, means for causing an echo pulse from said target to render visible a portion of the trace of the deflected cathode ray having a length inversely related to the range of said target, and means for maintaining the remainder of said trace invisible.

22. A pulse echo detection system including a receiver, a cathode ray beam tube having a fluorescent screen, means for generating two potentials whose instantaneous values and polarities are functions of the instantaneous azimuth and elevation, respectively, of the target, means for impressing both said potentials on said cathode ray tube for locating the cathode ray beam on the screen at a point whose rectangular coordinates indicate the azimuth and elevation of said target with reference to a neutral axis, means for limiting the response of said receiver to the nearest target, means for deflecting the cathode ray beam in a direction parallel to one of said rectangular coordinates alternately after each transmitted pulse, and means responsive to a target echo for producing a visible trace on said screen for a portion of the deflection of the beam varying inversely as the range of said target.

23. In a communication system, a cathode ray tube having a fluorescent screen; means for presenting spatial coordinate data as a linear trace on said screen; means for locating the center of said trace at a spot on said screen whose coordinates define two out of three of said spatial coordinates; and means for controlling the length of said trace in accordance with the third of said spatial coordinates; said last-named means including means for deflecting the cathode ray a fixed distance in the direction of said linear trace with a given period, and means for increasing the intensity of said cathode ray in response to a signal to render said trace visible at a time during each period when said deflected cathode ray is at a point corresponding to said third spatial coordinate.

LELAND J. HAWORTH.
EDWARD M. PURCELL.

REFERENCES CITED

The following references are of record in the file of this patent:

UNITED STATES PATENTS

| Number | Name | Date |
|---|---|---|
| 2,083,242 | Runge | June 8, 1937 |
| 2,105,537 | Kramar | Jan. 18, 1938 |
| 2,169,553 | Bruce | Aug. 15, 1939 |
| 2,189,549 | Hershberger | Feb. 6, 1940 |
| 2,231,929 | Lyman | Feb. 18, 1941 |
| 2,406,953 | Lewis | Sept. 3, 1946 |
| 2,412,702 | Wolff | Dec. 17, 1946 |
| 2,416,591 | Muntz et al. | Feb. 25, 1947 |
| 2,419,239 | White | Apr. 22, 1947 |
| 2,423,104 | Labin | July 1, 1947 |
| 2,426,218 | Hopgood | Aug. 26, 1947 |
| 2,427,905 | Fyler | Sept. 23, 1947 |
| 2,432,330 | Norgaard | Dec. 9, 1947 |
| 2,436,655 | Locke | Feb. 24, 1948 |
| 2,437,286 | Witt | Mar. 9, 1948 |
| 2,449,976 | Busignies | Sept. 28, 1948 |
| 2,500,552 | Lindenblad | Mar. 14, 1950 |
| 2,514,828 | Ayres | July 11, 1950 |